(12) United States Patent
Hara et al.

(10) Patent No.: US 11,119,023 B2
(45) Date of Patent: Sep. 14, 2021

(54) APPARATUS FOR EVALUATING GAS BARRIER PROPERTIES AND METHOD OF EVALUATING GAS BARRIER PROPERTIES

(71) Applicants: NATIONAL INSTITUTE OF ADVANCED INDUSTRIAL SCIENCE AND TECHNOLOGY, Tokyo (JP); MORESCO CORPORATION, Kobe (JP)

(72) Inventors: Shigeki Hara, Tsukuba (JP); Hajime Yoshida, Tsukuba (JP); Yoshikazu Takahashi, Kobe (JP); Yasushi Hosooka, Kobe (JP); Takahiro Imamura, Kobe (JP)

(73) Assignees: NATIONAL INSTITUTE OF ADVANCED INDUSTRIAL SCIENCE AND TECHNOLOGY, Tokyo (JP); MORESCO CORPORATION, Kobe (JP)

( * ) Notice: Subject to any disclaimer, the term of this patent is extended or adjusted under 35 U.S.C. 154(b) by 167 days.

(21) Appl. No.: 16/488,207

(22) PCT Filed: Feb. 26, 2018

(86) PCT No.: PCT/JP2018/006903
§ 371 (c)(1),
(2) Date: Aug. 22, 2019

(87) PCT Pub. No.: WO2018/155678
PCT Pub. Date: Aug. 30, 2018

(65) Prior Publication Data
US 2021/0131939 A1    May 6, 2021

(30) Foreign Application Priority Data
Feb. 27, 2017    (JP) .............................. JP2017-035207

(51) Int. Cl.
*G01N 15/08*    (2006.01)

(52) U.S. Cl.
CPC ....... *G01N 15/0806* (2013.01); *G01N 15/082* (2013.01); *G01N 2015/086* (2013.01)

(58) Field of Classification Search
CPC .... G01N 15/00; G01N 15/08; G01N 15/0806; G01N 15/0826; G01N 15/0846; G01N 2015/086; G01N 2015/0846
See application file for complete search history.

(56) References Cited

U.S. PATENT DOCUMENTS

| | | | |
|---|---|---|---|
| 7,624,621 B2 * | 12/2009 | Firon | G01N 15/0826 73/38 |
| 2004/0123646 A1 * | 7/2004 | Echigo | G01N 15/0826 73/38 |

(Continued)

FOREIGN PATENT DOCUMENTS

| | | |
|---|---|---|
| JP | 6-241978 A | 9/1994 |
| JP | 2002-357533 A | 12/2002 |

(Continued)

OTHER PUBLICATIONS

"Plastics-Film and sheeting-Determination of water vapour transmission rate-Instrumental method", JIS K7129:2008, Mar. 20, 2008, total of 7 pages.

(Continued)

*Primary Examiner* — Nguyen Q. Ha
(74) *Attorney, Agent, or Firm* — Birch, Stewart, Kolasch & Birch, LLP

(57) ABSTRACT

An apparatus for evaluating gas barrier properties, a support having a polymer for supporting a sample, a chamber on a permeation side, and a detection unit, the support being joined to the opening of the chamber on a permeation side; in which a polymer film is provided between the support and a sample; a chamber on a supply side is provided, being (Continued)

disposed so as to be closably attachable to the sample and able to go up and down; and an external chamber covers a region interposed between the polymer film and the support; and a method of evaluating gas barrier properties using the same.

19 Claims, 15 Drawing Sheets

(56) References Cited

U.S. PATENT DOCUMENTS

| | | |
|---|---|---|
| 2005/0092068 A1 | 5/2005 | Ascheman et al. |
| 2010/0236335 A1 | 9/2010 | Park et al. |
| 2010/0294025 A1 | 11/2010 | Omori et al. |
| 2015/0369720 A1 | 12/2015 | Hara et al. |
| 2016/0003726 A1 | 1/2016 | Hara et al. |

FOREIGN PATENT DOCUMENTS

| | | | | |
|---|---|---|---|---|
| JP | 2005-17172 A | | 1/2005 | |
| JP | 2008170358 A | * | 7/2008 | ............. G01N 15/08 |
| JP | 2010-190751 A | | 9/2010 | |
| JP | 2013-3028 A | | 1/2013 | |
| JP | 2013-3029 A | | 1/2013 | |
| JP | 2014-2038 A | | 1/2014 | |
| JP | 2014002038 A | * | 1/2014 | ............. G01N 15/08 |
| JP | 2014-167465 A | | 9/2014 | |
| JP | 2014-167466 A | | 9/2014 | |
| JP | 2016-31311 A | | 3/2016 | |
| JP | 2016031311 A | * | 3/2016 | ............. G01N 15/08 |
| WO | WO 2009/041632 A1 | | 4/2009 | |
| WO | WO-2010117012 A1 | * | 10/2010 | ......... G01N 15/0826 |
| WO | WO 2015/041115 A1 | | 3/2015 | |
| WO | WO 2016/114003 A1 | | 7/2016 | |

OTHER PUBLICATIONS

"Testing Method for Gas Transmission Rate through Plastic Film and Sheeting", JIS K7126-1987, total of 5 pages.
International Search Report for PCT/JP2018/006903 (PCT/ISA/210) dated Apr. 24, 2018.
Extended European Search Report, dated Nov. 19, 2020, for corresponding European Application No. 18757939.6.

* cited by examiner

COMPARATIVE EXAMPLE

COMPARATIVE EXAMPLE

Fig. 6 COMPARATIVE EXAMPLE

APPARATUS FOR EVALUATING GAS BARRIER PROPERTIES AND METHOD OF EVALUATING GAS BARRIER PROPERTIES

TECHNICAL FIELD

The present techniques relate to an apparatus for evaluating gas barrier properties of a film, and a method of evaluating gas barrier properties.

BACKGROUND ART

In recent years, in the field of organic electronics and the field of food packaging, there has been so far a demand for materials having low water vapor permeability or oxygen permeability, that is, a film or a sealing material having high gas barrier properties. Owing to the development of those materials and the inspection of products prior to shipment, there is a need for high-sensitivity evaluation techniques for gas barrier properties.

Methods of evaluating the gas barrier properties of a film-like sample are generally classified into an equal pressure method and a differential pressure methods. According to the equal pressure method, a gas including the gas to be evaluated is introduced onto one surface (hereinafter, also referred to as supply side) of a sample, and a carrier gas such as nitrogen is introduced onto the other surface (hereinafter, also referred to as permeation side). Then, the method involves measuring of the concentration of the permeated gas to be evaluated, which is included in the carrier gas being discharged, by means of a detection unit composed of an infrared sensor or the like (see, for example, Non-Patent Literatures 1 and 2). For a high-sensitivity evaluation, a method of using a crystal oscillator moisture meter or a mass analysis apparatus, and a method of temporarily blocking a permeation side, thereby concentrating the permeated gas to be evaluated, and then introducing the permeated gas to be evaluated into a detection unit, have been disclosed (see, for example, Patent Literatures 1 and 2).

The differential pressure method is a method of reducing pressure on a permeation side by a vacuum pump, introducing a gas including the gas to be evaluated onto the supply side, and then measuring the gas to be evaluated that has permeated the sample by means of a detection unit composed of a pressure meter or the like, the detection unit being provided on a permeation side (see, for example, Non-Patent Literature 3). Methods of using a mass analysis apparatus in order to evaluate the water vapor barrier properties of a film having high gas barrier properties have also been disclosed (see, for example, Patent Literatures 3, 4 and 5). With regard to the differential pressure method, it is necessary to support a sample against the pressure difference between the supply side and the permeation side, and it has been disclosed to use a porous stainless steel base material (see, for example, Patent Literatures 3 and 5), a polymer/water-permeable glass (see, for example, Patent Literature 4), and the like.

Furthermore, with regard to the method of using a mass analysis apparatus as a detector, an apparatus for evaluating gas barrier properties capable of measuring the gas barrier properties accurately by correcting a mass analysis apparatus without detaching the apparatus from the apparatus for evaluating gas barrier properties (Patent Literature 6) has been disclosed.

In the equal pressure methods, a component as an object of evaluation in a large amount of a carrier gas must be analyzed at the ppb level. However, gas analysis technique with high sensitivity of this level is limited. Furthermore, since a carrier gas includes water vapor or oxygen as impurities before being introduced into an evaluation apparatus, these impurities have imposed limitations on the evaluation sensitivity.

In the differential pressure methods, a support is needed. However, a sample to be evaluated undergoes deformation according to the surface unevenness at the support surface. As a result, there is a risk that the gas barrier properties of a film-like sample may be impaired, such as cracks occurring in a gas barrier layer that imparts gas barrier properties.

In all of the methods, when a sample is mounted on the apparatus, air is entrained into the apparatus along with the sample, and a long time period ranging from several days to several weeks is required for vacuum evacuation, a heating and degassing treatment, and the like for eliminating the influence of the entrainment (particularly, water vapor). This poses a major obstacle to material development or inspection prior to shipment.

In regard to such a problem, the following apparatus for evaluating gas barrier properties has been disclosed. This apparatus for evaluating gas barrier properties includes a support that supports a sample; a chamber on a permeation side; and a detection unit, and the support is joined to the opening of the chamber on the permeation side. Furthermore, the water vapor transmission rate of the support is $1\times10^{-10}$ mol/m$^2$sPa to $1\times10^{-14}$ mol/m$^2$sPa. It is considered that by means of this apparatus for evaluating gas barrier properties, inflow of air into the chamber on the permeation side at the time of sample exchange is inhibited, and consequently, efficacy such as sensitivity improvement and speedup of the evaluation is obtained (see, for example, Patent Literature 7).

Furthermore, an apparatus for evaluating gas barrier properties has been disclosed, which includes a support that supports a sample and contains a polymer; a chamber on a permeation side; and a detection unit, and in which the support is joined to the opening of the chamber on the permeation side, and the glass transition point of the polymer included in the support is 100° C. or higher. In this apparatus for evaluating gas barrier properties, since a heating and degassing treatment of the chamber on the permeation side is enabled, and the effects can be maintained even after sample exchange, it is considered after all that efficacy such as sensitivity improvement and speedup of evaluation is obtained (see, for example, Patent Literature 8).

CITATION LIST

Patent Literatures

Patent Literature 1: WO 2009/041632
Patent Literature 2: JP-A-2010-190751 ("JP-A" means unexamined published Japanese patent application)
Patent Literature 3: JP-A-6-241978
Patent Literature 4: JP-A-2002-357533
Patent Literature 5: JP-A-2005-17172
Patent Literature 6: WO 2015/041115
Patent Literature 7: JP-A-2014-167465
Patent Literature 8: JP-A-2014-167466

Non-Patent Literatures

Non-Patent Literature 1: JIS K7126-1987 (B method)
Non-Patent Literature 2: JIS K7129:2008
Non-Patent Literature 3: JIS K7126-1987 (A method)

SUMMARY OF INVENTION

Technical Problem

However, even with an apparatus for evaluating gas barrier properties in which such a support is joined to the opening of a chamber on the permeation side, the support surface is exposed to atmospheric air at the time of sample exchange. At this time, water vapor in the atmosphere penetrates through the support surface and is discharged into the chamber on the permeation side after a lapse of a certain time, and thereby water vapor flows into the chamber on the permeation side. When a sample having a WVTR of $10^4$ g/m² day or higher is measured, there is no problem. The WVTR (Water Vapour Transmission Rate) is an index representing water vapor permeability that is widely used for water vapor barrier properties, and is the amount of water vapor per unit area capable of permeating through a specimen in a unit time under defined temperature and humidity conditions. However, for the measurement of a sample having a lower WVTR, that is, a sample having markedly high gas barrier properties, this inflow of water vapor in the atmosphere brings serious influence on the determination of the completion of measurement or on the WVTR value itself. Therefore, when a sample having high gas barrier properties is measured, a heating and degassing treatment or evacuation for nearly one day after sample exchange is required.

The present invention relates to an apparatus for evaluating gas barrier properties and a method of evaluating gas barrier properties, each of which enables sample exchange while maintaining the environment inside a chamber on a permeation side satisfactorily by suppressing inflow of water vapor or the like in the atmosphere at the time of sample exchange.

Solution to Problem

In order to solve the problems described above, the following apparatus for evaluating gas barrier properties and the following method of evaluating gas barrier properties will be disclosed.

(1) An apparatus for evaluating gas barrier properties, containing a support having a polymer for supporting a sample, a chamber on a permeation side, and a detection unit, the support being joined to the opening of the chamber on a permeation side;

wherein a polymer film is provided between the support and a sample;

a chamber on a supply side is provided, being disposed so as to be closably attachable to the sample and able to go up and down; and an external chamber covers a region interposed between the polymer film and the support.

(2) The apparatus for evaluating gas barrier properties as described in the above item (1), wherein a dry gas source is connected to the external chamber.

(3) The apparatus for evaluating gas barrier properties as described in the above item (1) or (2), wherein the support is formed from a polyimide.

(4) The apparatus for evaluating gas barrier properties as described in any one of the above items (1) to (3), wherein the polymer film blocks an opening of a polymer film support ring having the opening at the center and is fixed to the polymer film support ring.

(5) A method of evaluating gas barrier properties, which contains using an apparatus for evaluating gas barrier properties, wherein the apparatus for evaluating gas barrier properties contains:

a support having a polymer;

a chamber on a permeation side; and a detection unit, wherein a front surface side of the support supports a sample while a rear surface side of the support is joined to the opening of the chamber on a permeation side, wherein a polymer film is disposed between the support and the sample, and wherein a protective region formed from a dry gas is provided between the support and the polymer film at the time of exchanging the sample.

(6) The method of evaluating gas barrier properties as described in the above item (5), wherein the apparatus for evaluating gas barrier properties contains an external chamber capable of isolating a region interposed between the polymer film and the support from atmospheric air, and wherein the protective region is provided by introducing a dry gas into the external chamber at the time of exchanging the sample.

(7) The method of evaluating gas barrier properties as described in the above item (5) or (6), wherein the support is formed from a polyimide.

The support is joined so as to block the opening of the chamber on the permeation side. The term "join" as used herein implies that the support and the chamber on the permeation side are integrated even at the time of sample exchange, and a reduced amount of gas flows in through the boundary between the support and the chamber on the permeation side as compared to the gas flowing into the chamber on the permeation side by permeating through the support. The joining may be achieved by fixing the support and the chamber on the permeation side using an adhesive. Alternatively, the support may be attached to the chamber on the permeation side using a gasket. Meanwhile, it is also acceptable to adopt a structure in which the support is detachable from the chamber on the permeation side, for the maintenance of the apparatus or the like. For example, the support can be joined to the chamber on the permeation side using an O-ring and a bolt different from an O-ring and a bolt for attaching a sample, or the like. In this configuration, there is no chance of the support coming off on the occasion of sample exchange, and the support can be easily exchanged at the time of maintenance or the like.

The gas permeability P [mol/m²sPa] of a material that divides a space (usually a plate, a film, or a tube) is an index defined by the following Equation (A).

$$J = P(p_1 - p_2) \quad (A)$$

$p_1$ [Pa] and $p_2$ [Pa] designate partial pressures of an identified gas (gas to be evaluated) on both sides of the interposed material; and J [mol/m²s] designates the permeation flux of this gas that permeates from the side surface in contact with $p_1$ to the side surface in contact with $p_2$.

The permeability to water vapor (water vapor transmission rate) of the support suitable for the present invention is $1 \times 10^{-8}$ mol/m²sPa to $1 \times 10^{-14}$ mol/m²sPa, preferably $8 \times 10^{-9}$ mol/m²sPa to $1 \times 10^{-13}$ mol/m²sPa, and more preferably $5 \times 10^{-9}$ mol/m²sPa to $1 \times 10^{-12}$ mol/m²sPa. $1 \times 10^{-10}$ mol/m²sPa corresponds to 1 g/m² day in terms of WVTR from a side surface in contact with 40° C. and 90% RH (water vapor pressure 6.6 kPa) to a side surface in contact with a water vapor partial pressure of 0 kPa. Furthermore, a porous support generally has a water vapor transmission rate greater than $1 \times 10^{-7}$ mol/m²sPa. In a case in which a support having a water vapor transmission rate greater than $1 \times 10^{-8}$ mol/m²sPa is used, the inflow of atmospheric components into the chamber on the permeation side at the time of sample exchange becomes large, and the advantages of the present invention are partially impaired. On the other hand, in a case in which a support having a water vapor transmission rate smaller than $1 \times 10^{-14}$ mol/m²sPa is used, evaluation of a sample having the water vapor transmission rate at a level of $1 \times 10^{-14}$ mol/m²sPa ($10^{-4}$ g/m² day) becomes difficult.

Even for an evaluation of a gas other than water vapor, it is desirable to select the support material based on the water vapor transmission rate as explained above. It is because even for an evaluation of a gas other than water vapor, suppression of inflow of water vapor into the chamber on the permeation side at the time of sample exchange brings about the effects of the present invention such as sensitivity improvement and speedup. In addition to this, it is desirable to appropriately select a support having a transmission rate matched to the type of gas to be evaluated. Meanwhile, a support having a high water vapor transmission rate generally exhibits approximately high transmission rates also for oxygen, nitrogen, carbon dioxide, and the like. Therefore, in many cases, it will be sufficient to select a support material based on the water vapor transmission rate.

It is not necessary to use a porous body as the support in order to realize the water vapor transmission rate described above. Rather, it is desirable to use a compact material. This term "compact" implies that there are no fine pores having a pore size of more than 1 nm, which penetrate through from one surface of the support on the sample side to the other surface. In this regard, it will suffice if fine pores having a pore size of 1 nm are not found when a support surface is observed using surface observation means such as a scanning electron microscope or an atomic force microscope. With these surface observation means, non-penetrating fine pores (for example, dents on the surface) cannot be distinguished from penetrating fine pores. However, as long as it can be confirmed that there are no fine pores on the surface, this implies that absence of penetrating fine pores is actually confirmed. Meanwhile, there are some examples in which interstices at an atomic level of polymer chains in a polymer material are referred to as "fine pores". However, in the present specification, interstices at an atomic level (that is, nm or less) formed between polymer chains are not regarded as fine pores.

By adopting the above-described configuration for the support, the environment (degree of vacuum, gas concentration, and the like) inside the chamber on the permeation side can be maintained favorably. Therefore, it is not necessary to dry up the water vapor on the inner wall of the chamber on the permeation side after the sample is attached. Therefore, evaluation of gas barrier properties can be achieved rapidly. In conventional apparatuses, there is a need to open first the space of the chamber on the permeation side at the time of sample exchange. As a result, water vapor in the atmosphere enters into the chamber on the permeation side and adheres to the inner wall of the chamber on the permeation side. Thus, it is required to evacuate the chamber on the permeation side after a sample is mounted, or to introduce a carrier gas into the chamber on the permeation side and wait for the water vapor adsorbed onto the inner wall of the chamber on the permeation side to dry up. For this purpose, several days were needed to be taken.

The apparatus for evaluating gas barrier properties of the present invention has, in addition to the configuration described above, a polymer film between the support and the sample and also has an external chamber that covers a region interposed between the polymer film and the support and suppresses penetration of atmospheric air. By means of this structure, it is possible to remarkably suppress penetration of water vapor into the chamber on the permeation side at the time of sample exchange. That is, when a dry gas is introduced into the external chamber prior to sample exchange, a protective region is provided on the sample-side surface of the support at the time of sample exchange, and water vapor in the atmosphere cannot reach the surface of the support. Here, the protective region means a space filled with a dry gas. A dry gas refers to a gas having a dew point of 0° C. (water vapor partial pressure is about ⅒ of the water vapor partial pressure at 40° C. and 90% RH) or lower. Specifically, a gas that has passed through a desiccant column, a gas that has passed through a cold trap using ice, a gas in a cylinder purchased as pure gas, nitrogen gas obtained by vaporizing liquid nitrogen, or the like can be used as the dry gas. During the sample exchange, a dry gas may be continuously introduced. However, as long as the protective region is maintained, it is not necessarily essential to continuously introduce a dry gas.

The configuration of inserting a polymer film between the support and the sample exhibits a remarkable effect despite being relatively simple and convenient. The polymer as used herein means a polymer having a number average molecular weight of 1,000 or more. The operational procedure of the evaluation of gas barrier properties may be as follows.

That is, a dry gas is introduced between the polymer film and the support, the external chamber is opened, and then the sample is exchanged.

Subsequently, the external chamber is closed, the space in the external chamber is evacuated, and thereby the gas between the polymer film and the support is removed. The sample is pressed by means of the chamber on the supply side. Then, a gas including the gas to be evaluated is introduced into the chamber on the supply side, and the gas to be evaluated that has permeated through the sample, the polymer film, and the support is measured by the detection unit provided in the chamber on the permeation side. In this manner, the gas barrier properties of a sample are evaluated.

Next, the effects of the respective operational procedures will be explained together with an example of the operation.

Prior to sample exchange, a dry gas, for example dry nitrogen, is introduced into the external chamber and the chamber on the supply side, the external chamber that was pressing the sample is removed. As a result, the gap between the polymer film and the support is filled with the dry gas, and a protective region is naturally formed by the dry gas. Subsequently, the external chamber is opened, and the sample is exchanged (or the sample is attached). When the distance between the polymer film and the support is sufficiently narrow, that is, when the protective region is sufficiently thin, sample exchange can be completed before atmospheric components penetrate through the edges of the protective region.

Furthermore, just in case, even if joining between the support and the chamber on the permeation side is unfastened at the time of sample exchange, there is no atmospheric air flowing directly into the chamber on the permeation side and damaging a detector or an ionization vacuum gauge. When a mass analysis apparatus that is used as a detector, and an ionization vacuum gauge for checking the degree of vacuum of the chamber on the permeation side are exposed to oxygen included in the atmosphere or a large amount of water vapor, the filaments are damaged and may lose the functions. Therefore, in conventional apparatuses that do not have a polymer film, it is necessary to consider the safety measures to be taken when joining between the support and the chamber on the permeation side is damaged.

After sample exchange, the external chamber is closed, and the space in the external chamber is evacuated. At this time, atmospheric components such as water vapor that are disperse in the atmosphere and have penetrated into the polymer film at the time of sample exchange, are evacuated through the gap between the polymer film and the sample and the gap between the polymer film and the support. When the polymer film is thin and is made of a material that easily releases gas such as water vapor, the atmospheric components that have penetrated into the polymer film can be removed in a relatively short time period. Subsequently, the sample is pressed by means of the chamber on the supply side, and as a gas to be evaluated, for example, water vapor is introduced into the chamber on the supply side. This water vapor is caused to permeate through the sample, the polymer film, and the support in sequence, the water vapor partial pressure inside the chamber on the permeation side is measured with a detector, and the water vapor transmission rate may be evaluated from that value.

The thickness of the polymer film is 1 µm to 100 µm, preferably 5 µm to 50 µm, and more preferably 10 µm to 25 µm. The thickness is appropriately selected in accordance with the diffusion coefficient of water vapor in the polymer, the measurement procedure, and the like. The time taken by water vapor to penetrate through one surface of the polymer film and to be discharged through the other surface is generally inversely proportional to the diffusion coefficient of water vapor and is properly proportional to the square of the thickness of the polymer film. When the apparatus for evaluating gas barrier properties is an apparatus with which sample exchange can be carried out in a short time period, it is preferable to use a polymer film having a thinness corresponding thereto. By using such a polymer film, the evacuation time thereafter can be made shorter. On the other hand, in the case of an apparatus for evaluating gas barrier properties with which it takes time for sample exchange, when a thick polymer film is used, the evacuation time can be shortened while the influence of water vapor penetrating at the time of sample exchange is suppressed.

Furthermore, it is preferable that the support is formed from polyimide. Polyimide has a lower nitrogen permeation rate against dry nitrogen than the nitrogen permeation rate against atmospheric air including water vapor. Therefore, the environment inside the chamber on the permeation side can be maintained more satisfactorily by exchanging the sample in dry nitrogen. In addition, since polyimide has excellent heat resistance, polyimide can endure a gas barrier properties evaluation at 85° C. and 85% RH or a heating and degassing heat treatment at about 100° C., which is frequently carried out at the beginning of operation of the apparatus.

For the detection unit, a pressure gauge can be used. In the case of using a pressure gauge, the gas permeability, that is, gas barrier properties, of a sample can be evaluated as follows.

The volume of the chamber on the permeation side is designated as V [m³], and the area of a gas permeation region of the sample is designated as S [m²]. The partial pressure on the supply side of the gas to be evaluated is designated as $p^f$ [Pa], and the partial pressure on the permeation side is designated as $p^p$ [Pa]. When the valve that is in communication with the interior of the chamber on the permeation side is closed, and the space inside the chamber on the permeation side is isolated from the outside, since the gas is a gas capable of permeating through the sample, the total number of molecules, n [mol], in the chamber on the permeation side increases by $\Delta n$ [mol] during $\Delta t$ [s]. As a result, an increase in pressure of $\Delta p^p$ [Pa] occurs in the chamber on the permeation side. At this time, when the temperature in the chamber on the permeation side is designated as T [K], and the gas constant is designated as R (=8.314 J/molK), Equation (1) is established from the equation of state of gas.

{Equation 1}

$$\Delta n = \frac{V}{RT} \Delta p^p \quad (1)$$

The permeation flux J [mol/m²s] of the gas to be evaluated is given by the following Equation (2).

{Equation 2}

$$J = \frac{1}{S} \frac{\Delta n}{\Delta t} = \frac{V}{RTS} \frac{\Delta p^p}{\Delta t} \quad (2)$$

The gas permeability $P^{tot}$ [mol/m²sPa] combining the sample, the support, and the polymer film can be defined by the following Equation (3).

{Equation 3}

$$J = P^{tot}(p^f - p^p) \quad (3)$$

The Equation (2) is substituted into the Equation (3), to obtain the following Equation (4).

{Equation 4}

$$P^{tot} = \frac{1}{S(p^f - p^p)} \frac{\Delta n}{\Delta t} = \frac{V}{RTS(p^f - p^p)} \frac{\Delta p^p}{\Delta t} \quad (4)$$

The gas permeability $P^f$ of the sample and the gas permeability $P^s$ combining the support and the polymer film can be expressed by Equations (5) and (6) using the partial pressure $p^b$ [Pa] of the gas to be evaluated at the interface between the sample and the polymer film.

{Equation 5}

$$J^f = P^f(p^f - p^b) \quad (5)$$

{Equation 6}

$$J^s = P^s(p^b - p^p) \quad (6)$$

In a steady state, since the gas to be evaluated does not stay at the interface between the sample and the polymer film, the permeation fluxes thereof are equal. That is, the relationship of Equation (7) is established.

{Equation 7}

$$J^f = J^s = J \quad (7)$$

Equation (8) is obtained from the Equations (5), (6) and (7).

{Equation 8}
$$J = \frac{P^f P^s}{P^f + P^s}(p^f - p^p) \quad (8)$$

In comparison with Equation (3), as the relationship of the gas permeability combining the support and the polymer film and the gas permeability of the whole system, Equation (9) is obtained.

{Equation 9}
$$P^{tot} = \frac{P^f P^s}{P^f + P^s} \quad (9)$$

When the gas permeability $P^s$ combining the support and the polymer film is investigated in advance, the gas permeability $P^f$ of the sample can be obtained by the following Equation (10), using the $P^{tot}$ obtained from an experiment using Equation (4).

{Equation 10}
$$P^f = \frac{P^{tot} P^s}{P^s - P^{tot}} \quad (10)$$

Furthermore, in a case in which the gas permeability of the sample is low, and $P^s >> P^f$, for example, in a case in which the values are different by a number of two digits or more, Equation (10) can be approximated as in the case of the following Equation (11).

{Equation 11}
$$P^f = P^{tot} \quad (11)$$

That is, the gas permeability of the sample is given by Equation (12).

{Equation 12}
$$P^f = \frac{V}{RTS(p^f - p^p)} \frac{\Delta p^p}{\Delta t} \quad (12)$$

When the gas to be evaluated is water vapor (molecular weight 18 g/mol), when the gas permeability is represented based on the unit of WVTR [g/m² day], the gas permeability can be determined as follows.

{Equation 13}
$$WVTR = 18 \times 24 \times 60 \times 60 \times J = \frac{1.56 \times 10^6 \times V}{RTS} \frac{\Delta p^p}{\Delta t} \quad (13)$$

In contrast, in a case in which the gas permeability $P^s$ combining the support and the polymer film is lower than the gas permeability $P^f$ of the sample, and $P^s << P^f$, the evaluation of the gas permeability $P^f$ of the sample becomes noticeably difficult. That is, it should be noted that the gas permeability $P^s$ combining the support and the polymer film must be higher than or equal at most to the gas permeability $P^f$ of the sample.

Furthermore, in order to evaluate a sample having high gas barrier properties, it is desirable to measure the partial pressure on the permeation side while evacuating without closing the valve that is in communication with the chamber on the permeation side. In that case, the gas permeability, that is, the gas barrier properties, can be evaluated as follows.

The effective evacuation rate of an evacuation meter is designated as $S_{eff}$ [m³/s]; the partial pressure on the permeation side when a sample to be measured is attached, a gas to be evaluated having a partial pressure $p^f$ [Pa] is introduced into the supply side, and then the permeation side is evacuated until a steady state is attained is designated as $p^p$ [Pa]; and the partial pressure on the permeation side that is assumed when a sample that does not allow gas permeation (for example, a metal plate) is attached is designated as $p^b$ [Pa]. At this time, the permeation flux J [mol/m²s] of the gas to be evaluated is given by the following Equation (14) using an increase in the partial pressure on the permeation side, $\Delta p^{pb}$ [Pa] ($= p^p - p^b$), produced by permeation of the gas to be evaluated.

{Equation 14}
$$J = \frac{S_{eff}}{SRT} \Delta p^{pb} \quad (14)$$

Since the gas permeability $P^{tot}$ [mol/m²sPa] combining the sample, the support, and the polymer film is defined by Equation (3), Equation (14) is substituted into Equation (3), and the following Equation (15) is obtained.

{Equation 15}
$$P^{tot} = \frac{S_{eff}}{SRT(p^f - p^p)} \Delta p^{pb} \quad (15)$$

The gas permeability $P^f$ [mol/m²sPa] of the sample can be obtained by Equation (10) using this $P^{tot}$, similarly to the case of closing the valve that is in communication with the interior of the chamber on the permeation side. In the same way, in a case in which the gas permeability of the sample is low, and $P^s >> P^f$, for example, in a case in which the values are different by a number of two digits or more, Equation (10) can be approximated as in the case of the following Equation (11). That is, the gas permeability of the sample is given by Equation (16).

{Equation 16}
$$P^f = \frac{S_{eff}}{SRT(p^f - p^p)} \Delta p^{pb} \quad (16)$$

When the gas to be evaluated is water vapor (molecular weight 18 g/mol), when the gas permeability is represented based on the unit of WVTR [g/m² day], the gas permeability can be determined as follows.

{Equation 17}

$$WVTR = 18 \times 24 \times 60 \times 60 \times J = \frac{1.56 \times 10^6 \times S_{eff}}{SRT} \Delta p^{pb} \quad (17)$$

Furthermore, it is desirable to employ an apparatus for evaluating gas barrier properties in which the detection unit is a mass analysis apparatus.

When a mass analysis apparatus is used, the partial pressure of the gas in the chamber on the permeation side can be evaluated directly. In a case in which humidified nitrogen is used as the gas supplied, not only water vapor but also some amount of nitrogen permeates. When a mass analysis apparatus is used in such a case, the partial pressure of water vapor can be evaluated, and therefore, a correct evaluation of the gas barrier properties can be achieved. Meanwhile, since the permeability of water vapor is generally high compared to other gases, in a case in which not a mass analysis apparatus but a pressure gauge is used, the permeability of water vapor can be approximated by regarding the total pressure inside the chamber on the permeation side as the water vapor partial pressure.

As such according to the present invention by which the gas barrier properties of a sample are evaluated from an increase in the partial pressure inside the chamber on the permeation side as such, a high-purity carrier gas is not needed, and therefore, disadvantages of the equal pressure method can be solved. Furthermore, since a support that does not have surface unevenness can be used, the defect of sample deformation, which is concerned in conventional differential pressure methods, can also be solved. In addition, at the time of attaching a sample, atmospheric air is not entrained into the chamber on the permeation side, and the gas barrier properties can be evaluated rapidly.

Furthermore, the present invention can be utilized even in a method of causing a carrier gas to flow into the chamber on the permeation side. In that case as well, atmospheric air is not entrained into the chamber on the permeation side at the time of attaching a sample, and gas barrier properties can be rapidly evaluated. The operation and the structure of the apparatus are also simple and convenient, and an effect such as that a highly sensitive detection unit can be used easily is also obtained at the same time.

Effects of Invention

As described above, according to the present invention, penetration of water vapor and the like in the atmosphere into the chamber on the permeation side at the time of sample exchange are suppressed, and sample exchange is enabled while the environment inside the chamber on the permeation side is maintained satisfactorily. As a result, when gas barrier properties of a sample having markedly high gas barrier properties are evaluated, it is made possible to shorten the time required for a series of procedures ranging from sample exchange to the completion of measurement.

Other and further features and advantages of the invention will appear more fully from the following description, appropriately referring to the accompanying drawings.

MODE FOR CARRYING OUT THE INVENTION

Figure 1:
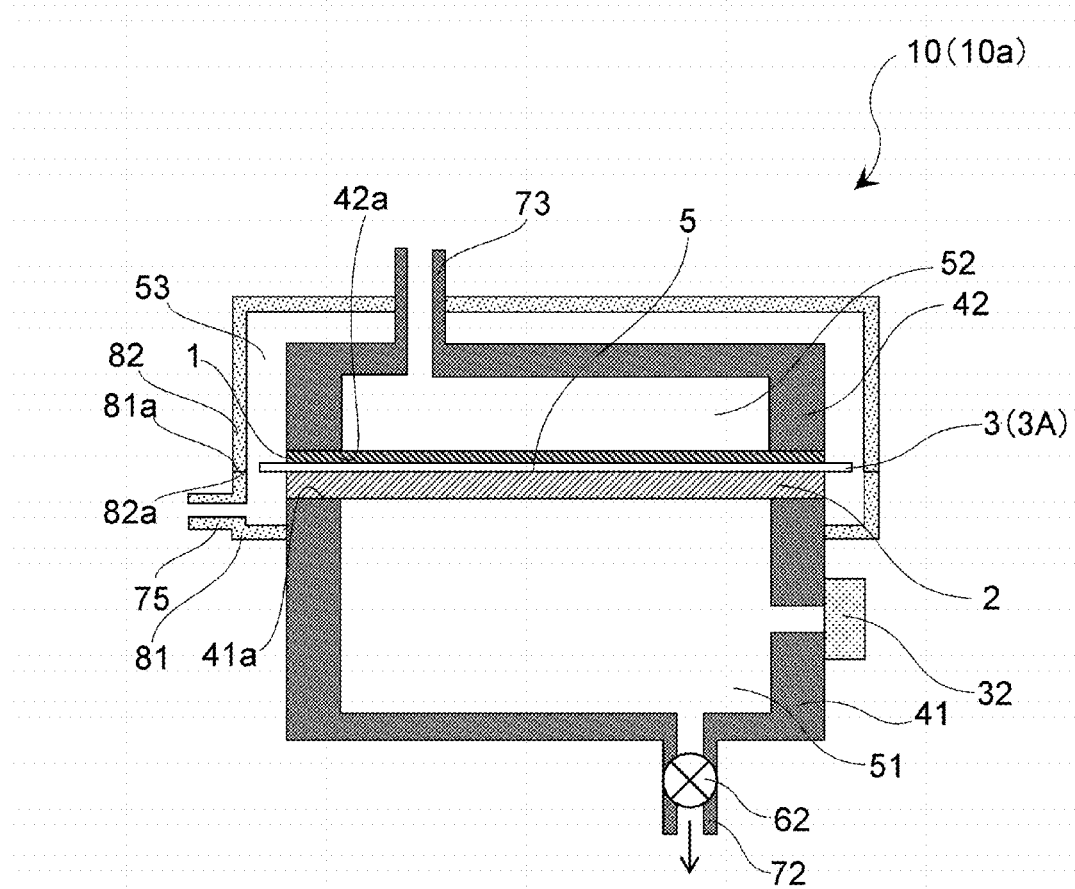
FIG. 1 is a cross-sectional view schematically illustrating the state upon measurement of a first embodiment related to the apparatus for evaluating gas barrier properties of the present invention.

As shown in FIG. 1, the apparatus for evaluating gas barrier properties 10 (10a) of the first embodiment has a chamber on a permeation side 41, and a support 2 supporting a sample 1 is joined with the opening 41a of the chamber. The term "join" implies that even when the sample 1 is exchanged, the support 2 and the chamber on the permeation side 41 are integrated, and a state in which a reduced amount of gas flows in through the boundary between the support 2 and the chamber on the permeation side 41 as compared to the gas flowing into the chamber on the permeation side by permeating through the support 2, is maintained. The means for joining is not particularly limited. However, for example, fixing by means of an adhesive may be mentioned. For example, a support 2 containing a polymer is fixed to the opening 41a of the chamber on the permeation side 41 with an adhesive.

It is preferable that the support 2 is produced into a shape conforming to the shape of the sample 1 in order to support the sample 1 to be evaluated. Since the sample 1 is a flat film in many cases, it is preferable to produce the support into a flat shape.

The polymer included in the support 2 refers to a polymer having, for example, a number average molecular weight of 1,000 or more. Preferred examples thereof include polyimide, polyamide, polycarbonate, polyether ether ketone, polyether sulfone, polyamide-imide, polyethylene, polypropylene, polyethylene terephthalate, polyethylene naphthalate, polyvinyl chloride, polyvinylidene chloride, polyacrylonitrile, polystyrene, polyphenylenesulfide, polytetrafluoroethylene, and nylon-66. Among those mentioned above, since polyimide has a lower nitrogen permeation rate against dry nitrogen than the nitrogen permeation rate against atmospheric air including water vapor, it is made possible to maintain the environment inside the chamber on the permeation side more satisfactorily by exchanging the sample in dry nitrogen. From such a viewpoint, polyimide is more preferred.

The thickness of the support 2 is 0.1 mm to 20 mm, preferably 0.2 mm to 10 mm, and more preferably 0.5 mm to 2 mm. Since this thickness is provided, the strength of the support is maintained, and handling of the apparatus is made easy. When the support is too thin, the support may be damaged or bent due to the pressure difference between the supply side and the permeation side, and therefore, it is not preferable. When the support is too thick, gas permeation through the edge surfaces around the support becomes non-negligible, and the apparatus becomes complicated in order to solve the problem. Meanwhile, the thickness as used herein means the total thickness in the external appearance. For example, in a case of two plates structure in which a metal plate having a large number perforated holes and a polymer plate are stacked and used, the thickness is the thickness of the sum. Sample 1 is supported by the support 2, and a polymer film 3 is inserted between the support 2 and the sample 1.

Furthermore, on the chamber on the permeation side 41, a chamber on the supply side 42 is disposed such that an opening 42a of the chamber on the supply side 42 faces the opening 41a of the chamber on the permeation side 41. The chamber on the supply side 42 is disposed so as to be closably attachable to the sample 1 and able to go up and down, such that the chamber on the supply side 42 forms a tightly sealed space with the chamber on the permeation side 41, with the support 2, the polymer film 3, and the sample 1 being interposed therebetween. The sample 1 and the polymer film 3 are fixed by being pressed to the support 2 side by the opening 42a of the chamber on the supply side 42. Elevation of the chamber on the supply side 42 is implemented by an elevation means that is not shown in the diagram. Meanwhile, a gasket that is not shown in the diagram may also be provided between the sample 1 and the opening 42a of the chamber on the supply side 42 in order to increase air tightness.

Preferred examples of the material for the above-described polymer film 3 include polyimide, polyimide-amide, polyether sulfone, polycarbonate, polyether ether ketone, polystyrene, polyvinyl chloride, nylon-66, polyethylene terephthalate, polyacrylonitrile, and polyethylene. Furthermore, from the viewpoints of thermal stability and high gas diffusibility of rapidly discharging dissolved gas, polyimide is more preferred. The thickness of the polymer film 3 is 1 µm or more and 100 µm or less, preferably 5 µm or more and 60 µm or less, and more preferably 10 µm or more and 30 µm or less. When the thickness of the polymer film 3 is too thin, the water vapor that has penetrated through the surface on the sample 1 side at the time of sample exchange is discharged through the support 2 side during sample exchange, water vapor in the atmosphere arrives at the protective region 4, and this water vapor flows into the chamber on the permeation side through the support. When the thickness of the polymer film 3 is too thick, time is taken until the water vapor that has penetrated through the surface on the sample 1 side is sufficiently discharged through the support 2 side.

The chamber on the supply side 42 is connected with a supply side gas piping 73, and the piping for an exhaust system and the piping for an evaluating gas introduction system are connected through a valve that is not shown in the diagram.

The chamber on the permeation side 41 is connected with a gas piping on the permeation side 72 that leads to a space on the permeation side 51, and this gas piping on the permeation side 72 is connected with a vacuum pump that is not shown in the diagram, with a valve 62 being interposed therebetween. Furthermore, the chamber on the permeation side 41 is connected with a detection unit (mass analysis apparatus) 32 that leads to the space on the permeation side 51. This detection unit 32 may be a vacuum gauge. However, it is desirable that the detection unit is a mass analysis apparatus. Although the gas in the space on the permeation side is mostly water vapor, hydrogen and the like are also included. Since the concentration of water vapor in the space on the permeation side can be measured distinctively from other gas species by using a mass analysis apparatus, reliability is enhanced compared to the case of using a vacuum gauge. Furthermore, since this method of evaluating gas barrier properties in which gas in a vacuum is analyzed, enables measurement of water vapor as a main component of the gas to be measured, measurement is facilitated. On the other hand, in the equal pressure method of related art techniques, since it is necessary to measure a trace amount of water vapor in a carrier gas with a sensitivity of ppm or higher, an edge-cutting technique is required.

Furthermore, there are an external chamber on the permeation side 81 and an external chamber on the supply side 82, which cover the region interposed between the polymer film 3 and the support 2. The space 53 in the external chamber disposed on the outside of the upper external part of the chamber on the permeation side 41, which includes the region interposed between the polymer film 3 and the support 2, and the chamber on the supply side 42, is covered by the external chamber on the permeation side 81 and the external chamber on the supply side 82, and thus tight sealing is enabled. Meanwhile, the periphery on the side of the chamber on the permeation side 41 in the external chamber on the permeation side 81 is sealed by an O-ring or the like on the external surface of the chamber on the permeation side 41. Thereby, tight sealing of the space 53 in the external chamber is further secured. Furthermore, an opening 81a of the external chamber on the permeation side 81 and an opening 82a of the external chamber on the supply side 82 face each other and are sealed by means of, for example, a gasket that is not shown in the diagram. Furthermore, the external chamber on the supply side 82 is made able to go up and down by means of an elevation means that is not shown in the diagram. Moreover, an external chamber gas piping 75 that leads to the space 53 in the external chamber is connected to the external chamber on the permeation side 81. This external chamber gas piping 75 is connected with the piping of the exhaust system and the piping of the gas introduction system, and the two systems are switched by an opening and closing valve that is not shown in the diagram. The piping of the exhaust system is connected with a vacuum pump. On the other hand, the piping of the gas introduction system is connected with a dry gas source that is not shown in the diagram. Examples of dry gas for the dry gas source include dry air, helium, nitrogen, oxygen, and argon, and nitrogen and argon are more preferred. From the viewpoint that the gas permeability of the support is generally low because the molecules are larger, nitrogen is even more preferred.

Figure 2:
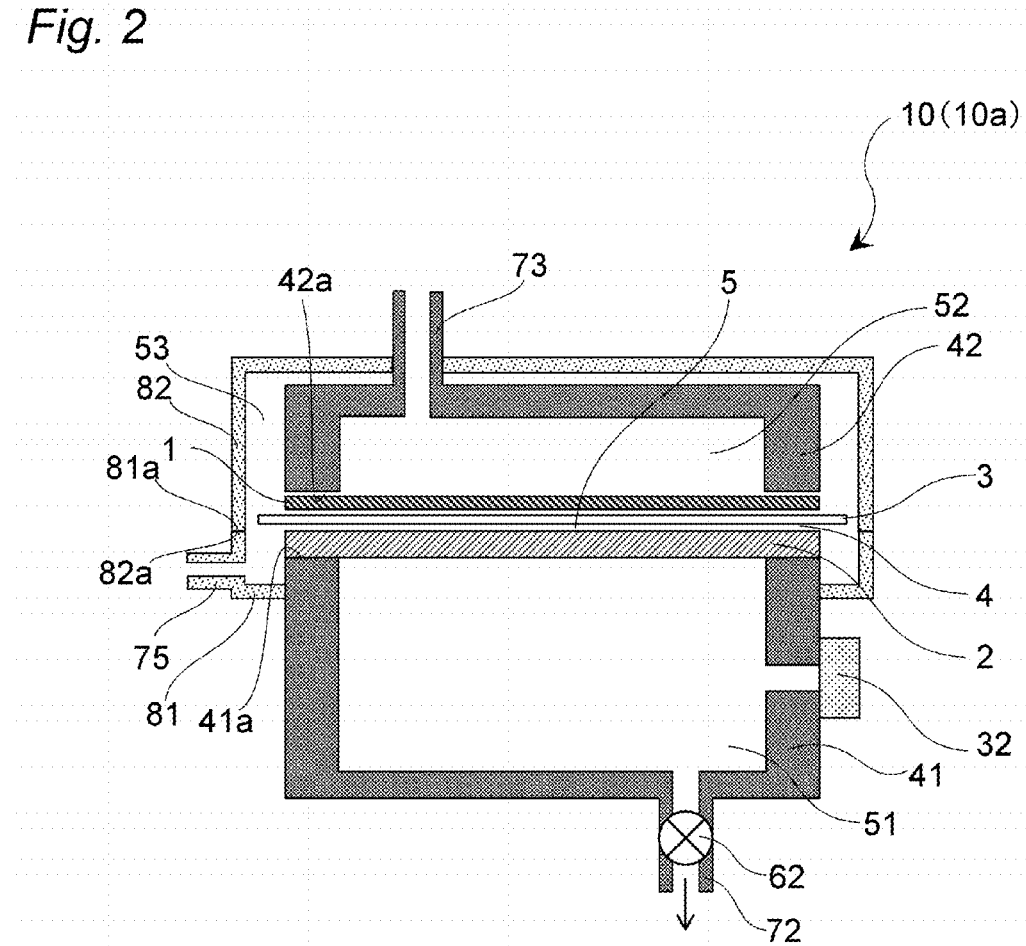
FIG. 2 is a cross-sectional view schematically illustrating the state immediately before sample exchange of the first embodiment related to the apparatus for evaluating gas barrier properties of the present invention.
Figure 3:
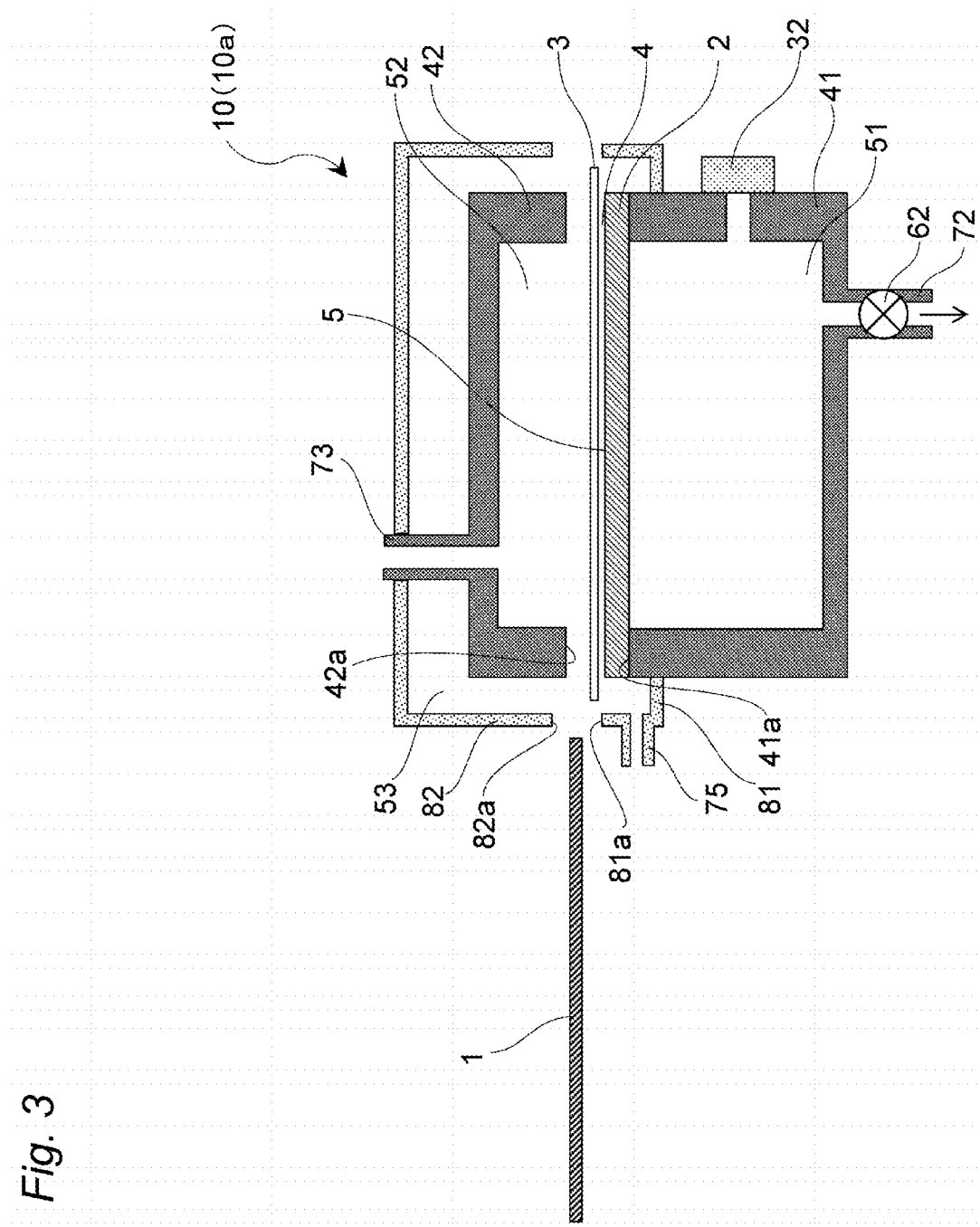
FIG. 3 is a cross-sectional view schematically illustrating the state at the time of sample exchange of the first embodiment related to the apparatus for evaluating gas barrier properties of the present invention.

As shown in FIG. 1 to FIG. 3, the method of evaluating gas barrier properties using the above-described apparatus for evaluating gas barrier properties 10 (10a) will be explained below.

As shown in FIG. 1, the support 2 is fixed and joined to the opening 41a side of the chamber on the permeation side 41 with an adhesive. A polymer film 3 is inserted between the support 2 and the sample 1, and the sample 1 and the polymer film 3 are fixed to the support 2 side by being pressed by the opening 42a of the chamber on the supply side 42.

During measurement, water vapor is introduced into the space on the supply side 52 in the chamber on the supply side 42, through the supply side gas piping 73. Water vapor permeates through the sample 1, the polymer film 3 (3A), and the support 2, and arrives at the space on the permeation side 51. The space on the permeation side 51 is evacuated using a vacuum pump (not shown in the diagram) through the gas piping on the permeation side 72. The gas partial pressure in the space on the permeation side 51 is measured using the detection unit (mass analysis apparatus) 32, and from the behavior, the WVTR value of the sample 1 is obtained. During the time, the space 53 in the external chamber is evacuated using a vacuum pump (not shown in the diagram) through the external chamber gas piping 75.

After gas barrier properties measurement is completed, the space on the supply side 52 is evacuated through the supply side gas piping 73. After sufficient evacuation is achieved, the piping of the exhaust system of the supply side gas piping 73 is closed, and the chamber on the supply side 42 is pulled up. Subsequently, dry gas is introduced through the external chamber gas piping 75. This state is illustrated in FIG. 2. When the chamber on the supply side 42 is pulled up, since pressing from above is eliminated, a small space is naturally formed between the polymer film 3 and the support 2. In this space, dry gas that has been introduced through the external chamber gas piping 75 flows in, and thereby a protective region 4 is formed.

Subsequently, the external chamber on the supply side 82 is pulled up, and the sample 1 is removed through the space between the external chamber on the supply side 82 and the external chamber on the permeation side 81. This state is shown in FIG. 3. Thereafter, a sample 1 to be measured next is disposed on the polymer film 3. In this operation of exchanging the sample 1, since the protective region 4 is in a state almost filled with dry gas, penetration of atmospheric components including water vapor into the support surface almost does not occur. Furthermore, when a dry gas is introduced into the space 53 in the external chamber or the space on the supply side 52, it is preferable to introduce the dry gas such that the space 53 in the external chamber or the space on the supply side 52 is in a state of higher air pressure than the atmospheric pressure. Thereby, when the external chamber on the supply side 82 is pulled up, it is difficult for the atmospheric air to enter the space 53 in the external chamber, and the environment of the protective region 4 can be maintained over a long time period.

After the exchange of the sample 1 is completed, the external chamber on the supply side 82 is lowered, and thereby the space 53 in the external chamber is closed. It is preferable that such an operation of exchanging the sample 1 is carried out rapidly. However, when time is taken for the exchange operation, the design of the apparatus may be devised to use a thicker polymer film 3, or the like. Next, the space 53 in the external chamber is evacuated through the external chamber gas piping 75. At this time, the space on the supply side 52 that is in communication is also evacuated through the external chamber gas piping 75. Furthermore, the gas components in the atmosphere that have penetrated through the sample 1 side of the polymer film 3 at the time of sample exchange are discharged through both the sample 1 side and the support 2 side of the polymer film 3, and are evacuated through the external chamber gas piping 75. As a result, inflow of the gas components in the atmosphere into the space on the permeation side 51 can be prevented. After sufficient evacuation is achieved, the chamber on the supply side 42 is lowered, and the space on the supply side 52 is closed. Subsequently, water vapor is introduced into the space on the supply side 52 through the supply side gas piping 73. In this manner, the measurement state of FIG. 1 is attained again. The gas partial pressure in the space on the permeation side 51 is measured using the detection unit (mass analysis apparatus) 32, and from this value, the WVTR value can be obtained.

With the above-described apparatus for evaluating gas barrier properties 10a and the method of evaluating gas barrier properties using the apparatus, a protective region 4 formed from a dry gas is provided on the sample-side surface 5 of the support 2 at the time of exchanging the sample 1, and water vapor in the atmosphere cannot reach the support surface 5. Therefore, inflow of water vapor and the like in the atmosphere into the space on the permeation side 51 at the time of exchanging the sample 1 can be suppressed. As a result, exchange of the sample 1 is enabled while the environment of the space on the permeation side 51 is maintained satisfactorily.

Next, a conventional apparatus for evaluating gas barrier properties 10*b* will be explained as Comparative Example, with reference to FIGS. 4 to 6.

Figure 4:
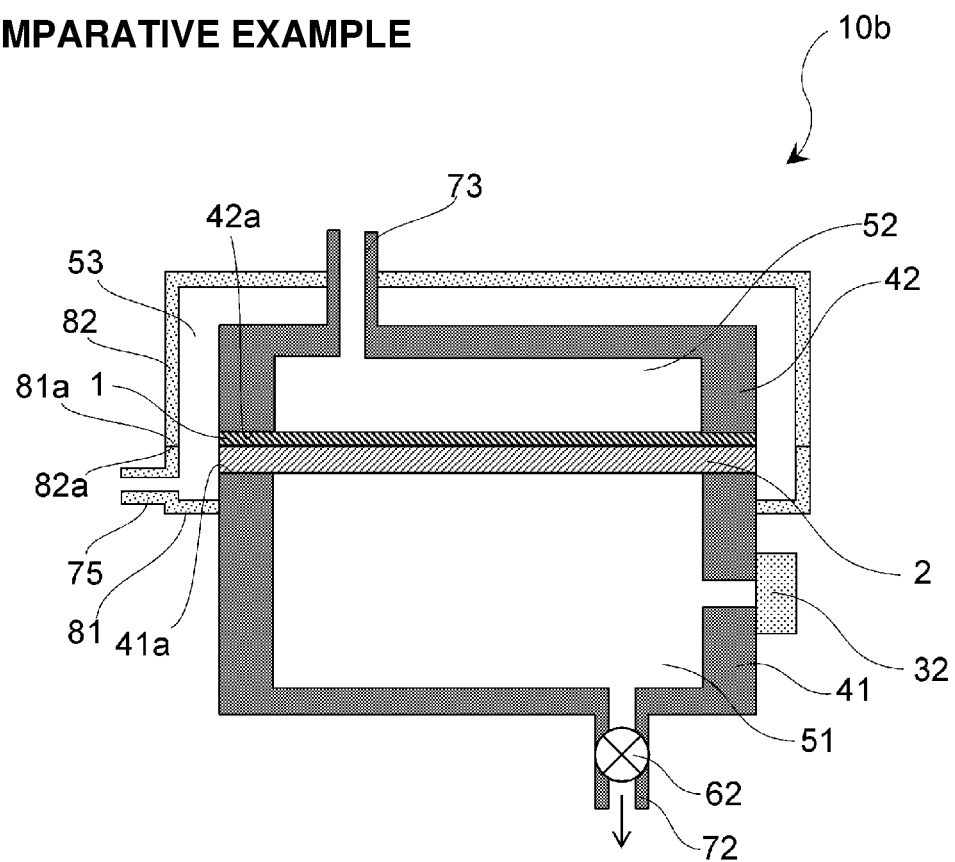
FIG. 4 is a cross-sectional view schematically illustrating the state upon gas barrier properties measurement of Comparative Example 1 related to the apparatus for evaluating gas barrier properties of the present invention.

As shown in FIG. 4, the apparatus for evaluating gas barrier properties 10*b* of Comparative Example has a configuration similar to that of the apparatus for evaluating gas barrier properties 10*a* of the first embodiment shown in FIG. 1, except that the polymer film 3 is absent.

After gas barrier properties measurement is completed, the space on the supply side 52 is evacuated through the supply side gas piping 73. After sufficient evacuation is achieved, the piping of the exhaust system of the supply side gas piping 73 is closed, and the chamber on the supply side 42 is pulled up. Subsequently, dry gas is introduced through the external chamber gas piping 75. This state is illustrated in FIG. 5. When the chamber on the supply side 42 is pulled up, since pressing from above is eliminated, a small space is naturally formed between the sample 1 and the support 2. In this space, dry gas that has been introduced through the external chamber gas piping 75 flows in, and thereby a protective region 4 is formed.

Subsequently, the external chamber on the supply side 82 is pulled up, and the sample 1 is removed through the space between the external chamber on the supply side 82 and the external chamber on the permeation side 81. This state is shown in FIG. 6. At this time, atmospheric air flows into the external chamber 53 and arrives at the region 5 on the support surface, and thus the protective region 4 disappears. Gas components such as water vapor in the atmosphere penetrate into the support 2 through the surface of the support 2. In such a state, a sample 1 to be measured next is disposed on the support 2. Then, the external chamber on the supply side 82 is lowered, the space 53 in the external chamber is closed, and then the space 53 in the external chamber is evacuated through the external chamber gas piping 75.

At this time, the space on the supply side 52 that is in communication is also evacuated through the external chamber gas piping 75. However, the gas components that have penetrated into the support 2 diffuse through the support 2 and are discharged through the surface of the support on the side of the space on the permeation side 51 of the support 2. Evacuation of the space on the permeation side 51 is continued until discharge through the surface of the support 2 on the side of the space on the permeation side 51 no longer occurs. Subsequently, the chamber on the supply side 42 is lowered, and the space on the supply side 52 is closed.

Subsequently, water vapor is introduced into the space on the supply side 52 through the supply side gas piping 73. In this manner, the measurement state of FIG. 4 is attained again. The gas partial pressure in the space on the permeation side 51 is measured using the detection unit (mass analysis apparatus) 32, and from this value, the WVTR value is obtained.

In this method, since gas components such as water vapor in the atmosphere penetrate into the support 2, it is necessary to wait until those components are no longer discharged through the side of the space on the permeation side 51. Therefore, the time required for a series of procedures ranging from the exchange of samples to the completion of measurement is lengthened, and the efficiency of evaluation is decreased.

Next, an apparatus for evaluating gas barrier properties 10 (10*c*) of a second embodiment will be explained with reference to FIGS. 7 to 9. The apparatus for evaluating gas barrier properties 10*c* has a configuration similar to that of the apparatus for evaluating gas barrier properties 10*a*, except that the shape and the position of installation of a polymer film 3 (3B) are different from those for the apparatus for evaluating gas barrier properties 10*a*.

Figure 7:
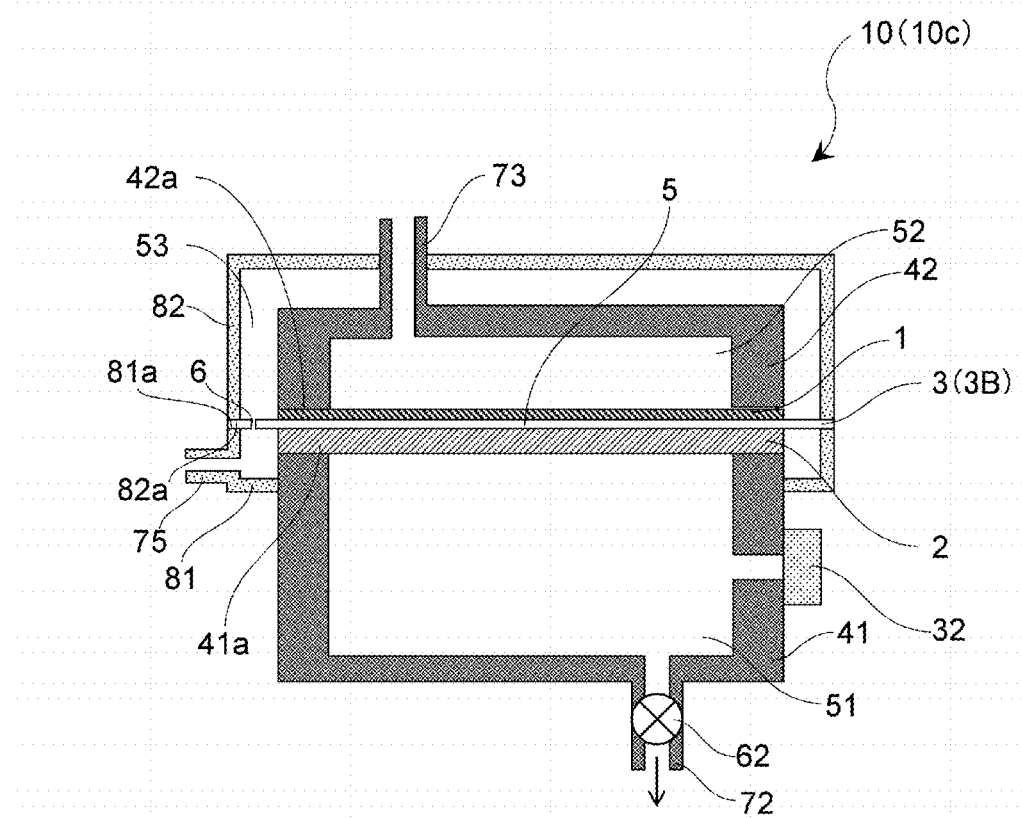
FIG. 7 is a cross-sectional view schematically illustrating the state upon measurement of a second embodiment related to the apparatus for evaluating gas barrier properties of the present invention.

First, FIG. 7 shows the state of the apparatus for evaluating gas barrier properties 10*c* at the time of measuring the gas barrier properties.

As illustrated in FIG. 7, the polymer film 3 (3B) is fixed and joined to the opening of an external chamber on the permeation side 81 using an adhesive. In this polymer film 3B, a hole 6 penetrating through in the thickness direction is opened, and gas may escape therethrough in the thickness direction of the polymer film. The diameter of the hole 6 is 0.1 mm or more and 10 mm or less, preferably 0.5 mm or more and 5 mm or less, and more preferably 1 mm or more and 3 mm or less. The number of holes 6 may be one; however, there may be a large number. The size, number, disposition and the like of the holes 6 are appropriately designed from the viewpoint of the flow of the gas inside the space 53 in the external chamber. This polymer film 3B is disposed on the support 2 so as to be in contact with the support 2, and a sample 1 is disposed thereon. Then, the sample 1 and the polymer film 3B are fixed by pressing to the support 2 side by an opening 42*a* of the chamber on the supply side 42. Furthermore, the space 53 in the external chamber is evacuated through the external chamber gas piping 75. As such, the same configuration as that of the apparatus for evaluating gas barrier properties 10*a* of the first embodiment, except for the polymer film 3B, is adopted.

After gas barrier properties measurement is completed, the space on the supply side 52 is evacuated through the supply side gas piping 73. After sufficient evacuation is achieved, the piping of the exhaust system of the supply side gas piping 73 is closed, and the chamber on the supply side 42 is pulled up. Subsequently, dry gas is introduced through the external chamber gas piping 75. The dry gas flows into both sides of the polymer film 3B in the space 53 in the external chamber through the hole 6 of the polymer film 3B.

Figure 8:
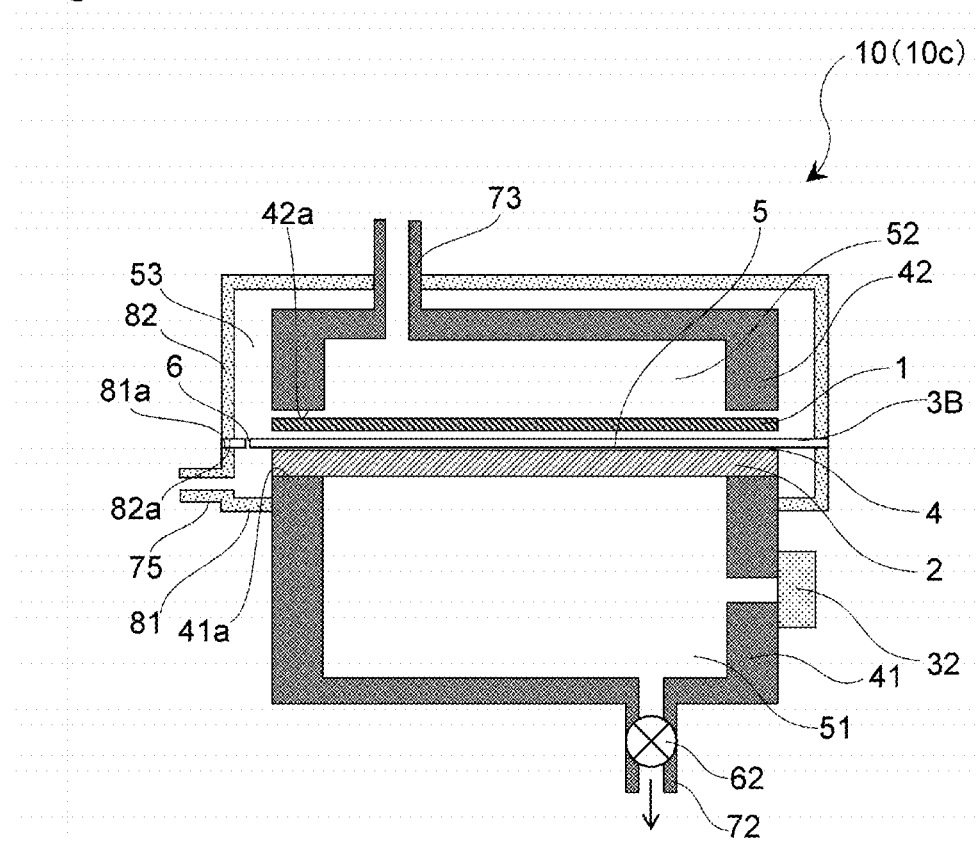
FIG. 8 is a cross-sectional view schematically illustrating the state immediately before sample exchange of the second embodiment related to the apparatus for evaluating gas barrier properties of the present invention.
Figure 9:
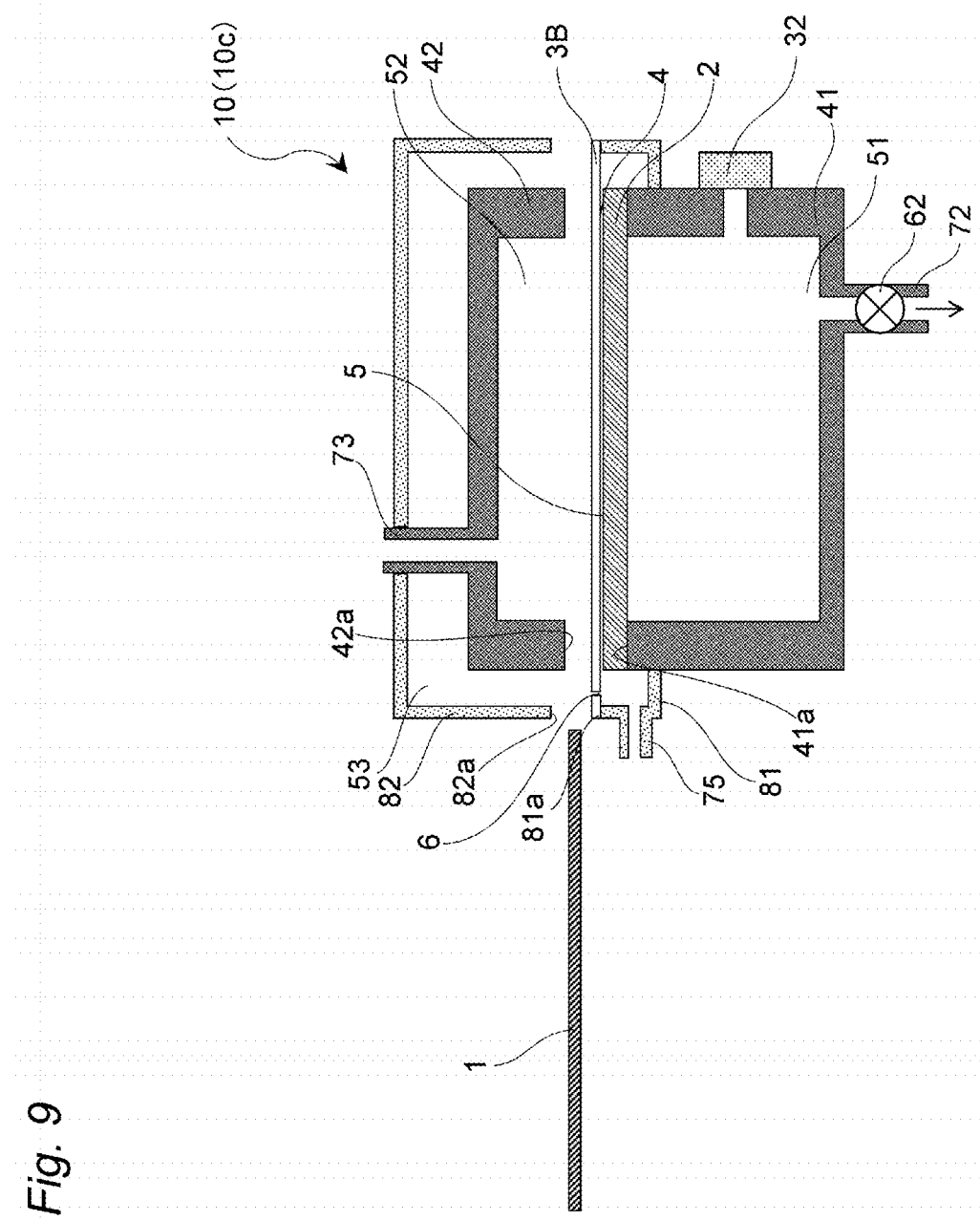
FIG. 9 is a cross-sectional view schematically illustrating the state at the time of sample exchange of the second embodiment related to the apparatus for evaluating gas barrier properties of the present invention.

This state is illustrated in FIG. 8. When the chamber on the supply side 42 is pulled up, since pressing from above is eliminated, a small space is naturally formed between the polymer film 3B and the support 2. In this space, dry gas that has been introduced through the external chamber gas piping 75 flows in, and thereby a protective region 4 is formed.

Subsequently, the external chamber on the supply side 82 is pulled up, and the sample 1 is removed through the space between the external chamber on the supply side 82 and the external chamber on the permeation side 81. This state is shown in FIG. 9. Subsequently, the sample 1 to be measured next is disposed on the polymer film 3B, the external chamber on the supply side 82 is lowered, and the space 53 in the external chamber is closed. Subsequently, the space 53 in the external chamber is evacuated through the external chamber gas piping 75. At this time, the space on the supply side 52 that is in communication is also evacuated through the external chamber gas piping 75. The gas components in the atmosphere that have penetrated through the sample 1 side of the polymer film 3B at the time of sample exchange are discharged through both the sample 1 side and the support 2 side of the polymer film 3B, and are evacuated through the external chamber gas piping 75. As a result, inflow of the gas components in the atmosphere into the space on the permeation side 51 can be prevented. After sufficient evacuation is achieved, the chamber on the supply side 42 is lowered, and the space on the supply side 52 is closed. Subsequently, water vapor is introduced into the space on the supply side 52 through the supply side gas piping 73. In this manner, the measurement state of FIG. 7 is attained again. The gas partial pressure in the space on the permeation side 51 is measured using the detection unit (mass analysis apparatus) 32, and from this value, the WVTR value can be obtained.

With this apparatus for evaluating gas barrier properties 10c, an operation effect similar to that of the apparatus for evaluating gas barrier properties 10a can be obtained. Together with that, the apparatus for evaluating gas barrier properties 10c has the following operation effect. That is, since the polymer film 3B is fixed to an opening 81a of an external chamber on the permeation side 81, although the polymer film 3B has the hole 6, the external chamber on the permeation side 81 is in a state close to a sealed space by means of the polymer film 3B. In such a state, when a dry gas is introduced through the external chamber gas piping 75 on the side of the external chamber on the permeation side 81, the pressure becomes higher than the atmospheric pressure, and inflow of atmospheric air including water vapor to the support 2 side of the polymer film 3B through the hole 6 can be suppressed. As a result, even if a long time is taken for sample exchange, a protective space 4 is maintained, and the environment of a space on the permeation side 51 can be maintained satisfactorily.

Since the hole 6 is disposed in the polymer film 3B, a dry gas can be sent also to the space 53 in the external chamber of the external chamber on the supply side 82 through the hole 6 by introducing the dry gas through the external chamber gas piping 75 after measurement. At that time, by lifting the chamber on the supply side 42, the dry gas flows into the space on the supply side 52 through the gap produced by the lifting. Therefore, it is not necessary to introduce a dry gas separately through the supply side gas piping 73. However, in a case in which it is wished to introduce a dry gas faster into the space on the supply side 52, or the like, the dry gas may be introduced through the supply side gas piping 73.

Figure 10:
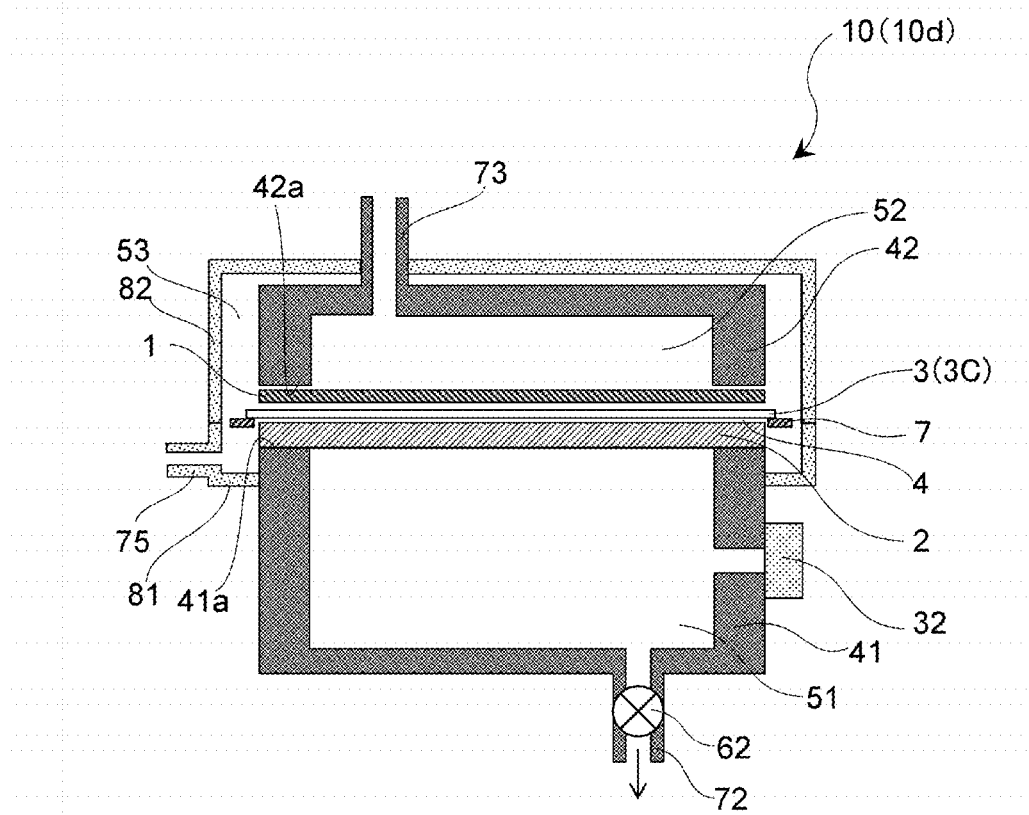
FIG. 10 is a cross-sectional view schematically illustrating the state immediately before sample exchange of a third embodiment related to the apparatus for evaluating gas barrier properties of the present invention.

Next, an apparatus for evaluating gas barrier properties 10 (10d) of a third embodiment will be explained with reference to FIG. 10. The apparatus for evaluating gas barrier properties 10d has a configuration similar to that of the apparatus for evaluating gas barrier properties 10a, except that the polymer film 3 (3C) is supported by a polymer film support ring.

A polymer film support ring 7 is constructed from a plate-shaped compact material (aluminum, polypropylene, or the like) having an opening at the center, and the polymer film 3 (3C) is fixed thereto using an adhesive or the like so as to block this opening and is integrated with the support ring. Furthermore, the polymer film support ring 7 is fixed to the chamber on the permeation side 41 using a fixing tool that is not shown in the diagram, such that the polymer film 3C is in contact with the support 2. There is provided a gap between the polymer film support ring 7 and the external chamber on the permeation side 81.

When a dry gas is introduced through the external chamber gas piping 75 for sample exchange, due to the pressure of the dry gas, the polymer film 3 is slightly bent, and a protective region 4 is formed between the polymer film 3 and the support 2. Furthermore, the dry gas flows out to the upper side of the polymer film support ring 7 through a gap between the polymer film support ring and the external chamber on the permeation side 81, and penetration of atmospheric air is prevented. After sample exchange, when the space 53 in the external chamber is evacuated through the external chamber gas piping 75, the space on the supply side 52 that is in communication through this gap is also evacuated.

In this manner, penetration of atmospheric air can be reliably prevented using the thin polymer film 3.

EXAMPLES

The present invention will be described in more detail based on examples given below, but the invention is not meant to be limited by these.

Example 1

Measurement of a film-like sample (sample 1) was carried out using the apparatus for evaluating gas barrier properties 10 (10a) described in FIGS. 1 to 3.

Figure 11:
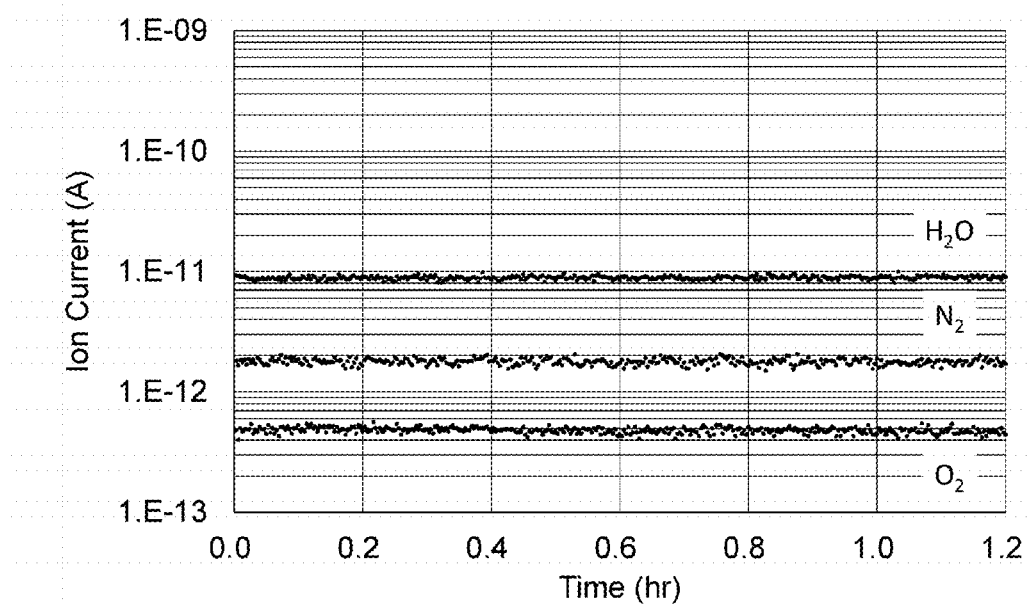
FIG. 11 is a graph showing changes in the ion current values of a detector (mass analysis apparatus) after initiation of the evacuation inside the external chamber in Example 1 related to the barrier properties evaluation apparatus of the present invention.
Figure 12:
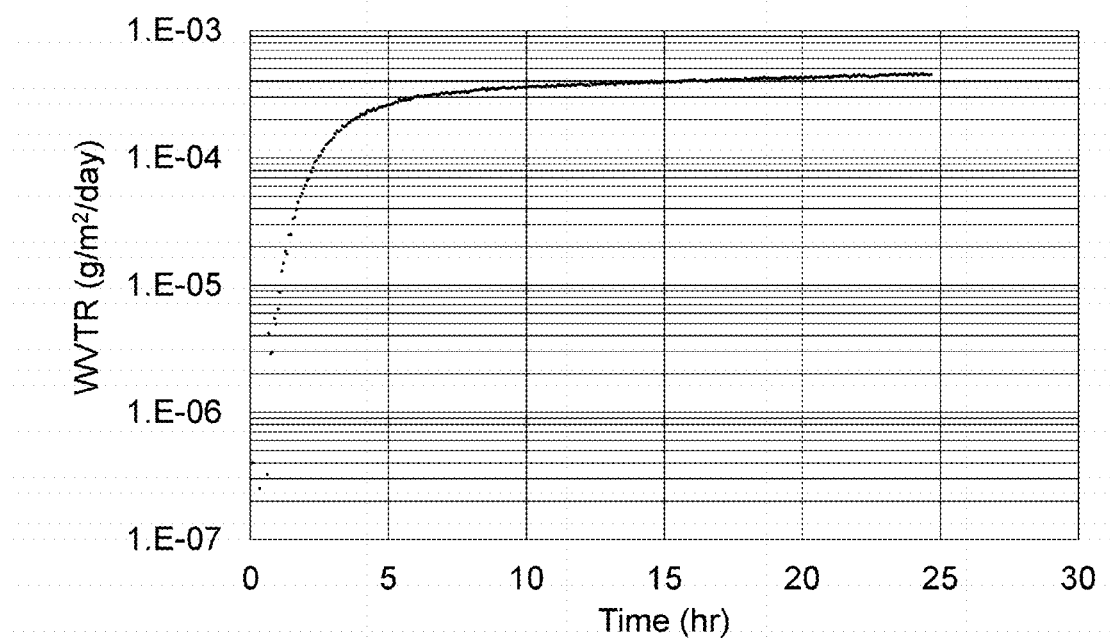
FIG. 12 is a graph showing a change in the WVTR value after initiation of the evacuation inside the external chamber in Example 1 related to the barrier properties evaluation apparatus of the present invention.

As the sample 1, a polyethylene naphthalate film having a thickness of 0.1 mm and having a barrier layer formed on the surface was used. As the support 2, a plate-like body made of polyimide and having a thickness of 125 μm and a stainless steel metal plate having a thickness of 1 mm and having a large number of 2-mmϕ holes were superposed and used. The plate-shaped polyimide film was fixed and joined to the chamber on the permeation side using an adhesive. A polyimide film having a thickness of 13 μm was used as the polymer film 3. The sample 1 was exchanged over about 2 minutes, the external chamber on the supply side 82 was lowered, and the space 53 in the external chamber was closed. The space 53 in the external chamber was evacuated through the external chamber gas piping 75 (state of FIG. 2). The relationship between the time after the initiation of evacuation of the space 53 in the external chamber and the indicator values (ion current that increases or decreases according to the increase or decrease of various gas species) of the detection unit (mass analysis apparatus 32) is shown in FIG. 11. As shown in FIG. 11, the ion currents for water vapor, nitrogen, and oxygen did not change over one hour, and it is understood that there was no inflow of those gas components into the space on the permeation side 51. Subsequently, the chamber on the supply side 42 was lowered, the space on the supply side 52 was closed, and water vapor was introduced through the supply side gas piping 73. The change in the WVTR value thereafter was as shown in FIG. 12, and after a lapse of one day, the value was almost stabilized. Thus, a value of $4 \times 10^{-4}$ g/m$^2$ day was obtained.

Figure 13:
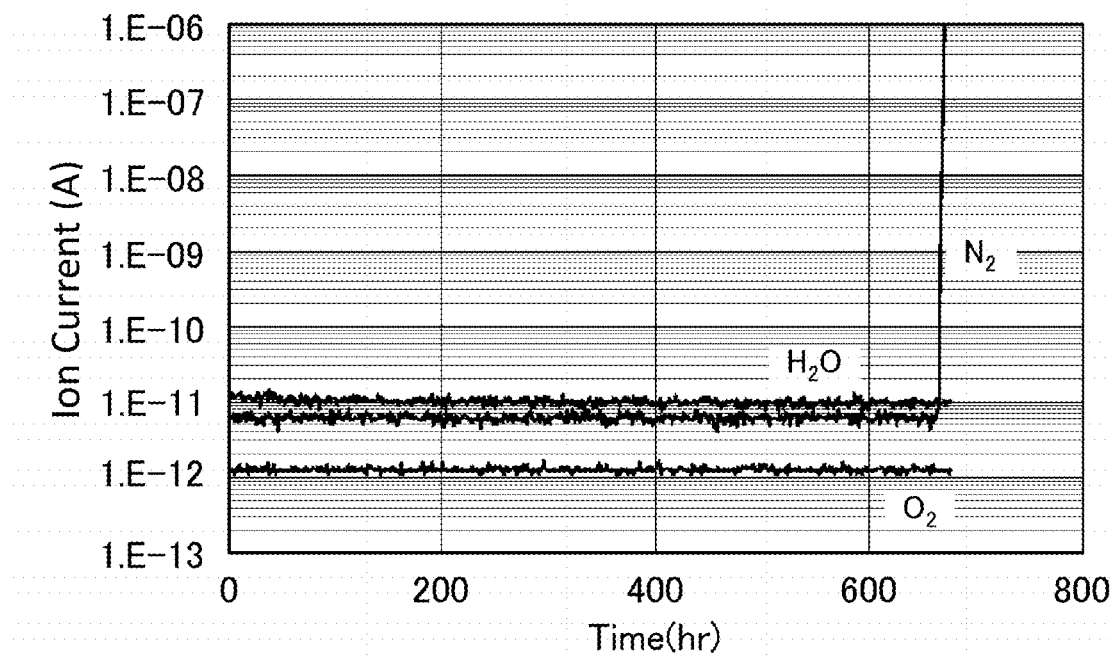
FIG. 13 is a graph showing changes in the ion current values of a detector (mass analysis apparatus) when the joining between the support and the chamber on the permeation side has been partially damaged, in Example 1 related to the apparatus for evaluating gas barrier properties of the present invention.

Subsequently, the gas barrier properties were repeatedly evaluated, and at a certain time, the indicator value representing nitrogen of the detection unit (mass analysis apparatus) 32 increased greatly at the time of sample exchange, as shown in FIG. 13. The apparatus for evaluating gas barrier properties was stopped and inspected, and it was found that the joining between the support 2 and the chamber on the permeation side 41 provided by an adhesive was partially damaged. Thus, the support 2 was exchanged and joined to the chamber on the permeation side 41 using an adhesive, and the barrier properties evaluation apparatus was produced again. The detection unit (mass analysis apparatus) 32 was not damaged, and thereafter, evaluation of the gas barrier properties was made possible without any change. That is, it is understood that by adopting the structure of the present invention, there are no need for any special safety measures to be taken when the joining between the support and the chamber on the permeation side is damaged.

Comparative Example 1

Figure 5:
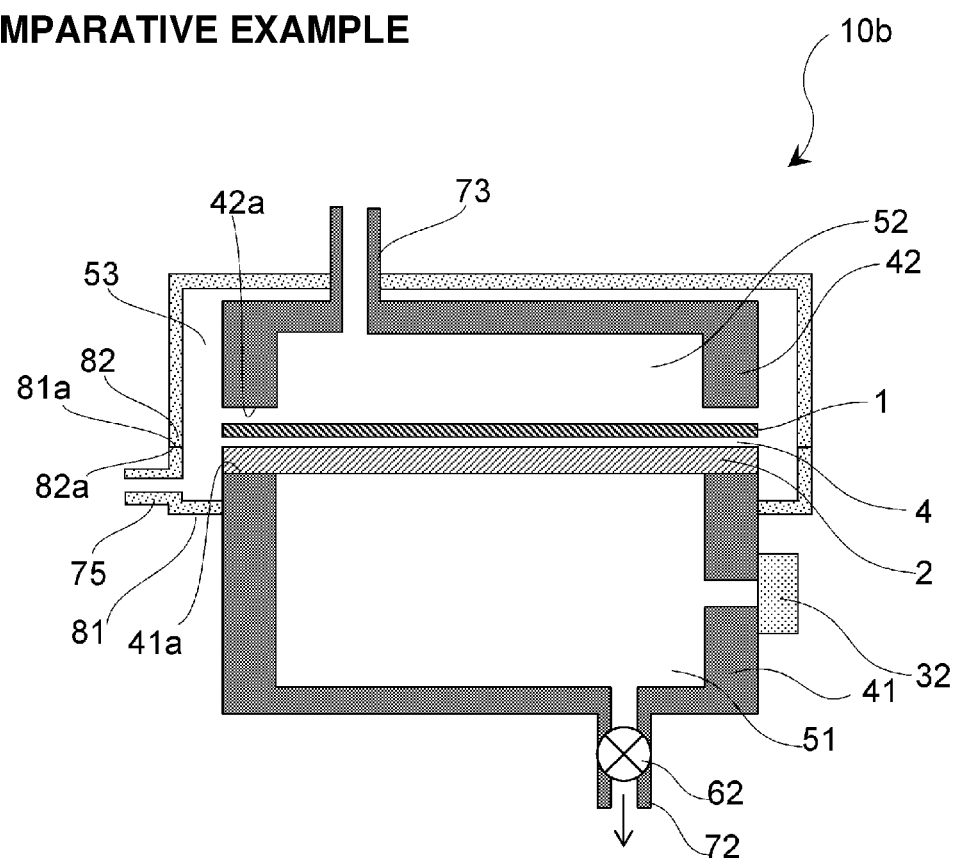
FIG. 5 is a cross-sectional view schematically illustrating the state immediately before sample exchange of the Comparative Example 1 related to the apparatus for evaluating gas barrier properties of the present invention.
Figure 6:
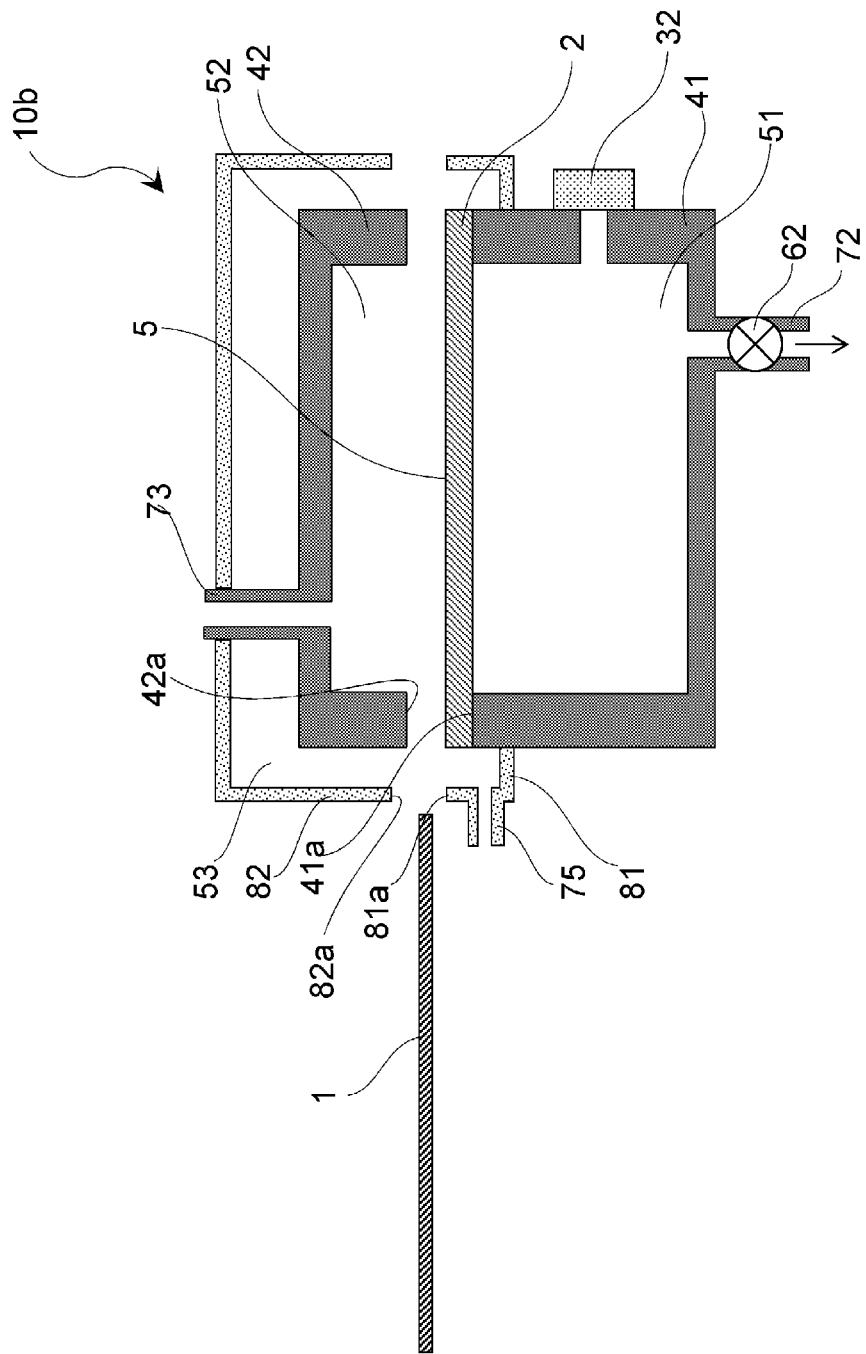
FIG. 6 is a cross-sectional view schematically illustrating the state at the time of sample exchange of the Comparative Example 1 related to the apparatus for evaluating gas barrier properties of the present invention.

Measurement of a film-like sample (sample 1) similar to that used in Example 1 was carried out using the apparatus for evaluating gas barrier properties 10 (10b) described in FIGS. 4 to 6. The apparatus for evaluating gas barrier properties 10b has a configuration similar to that of the apparatus for evaluating gas barrier properties 10a, except that the polymer film 3 used in the apparatus for evaluating gas barrier properties 10a is not used.

Figure 14:
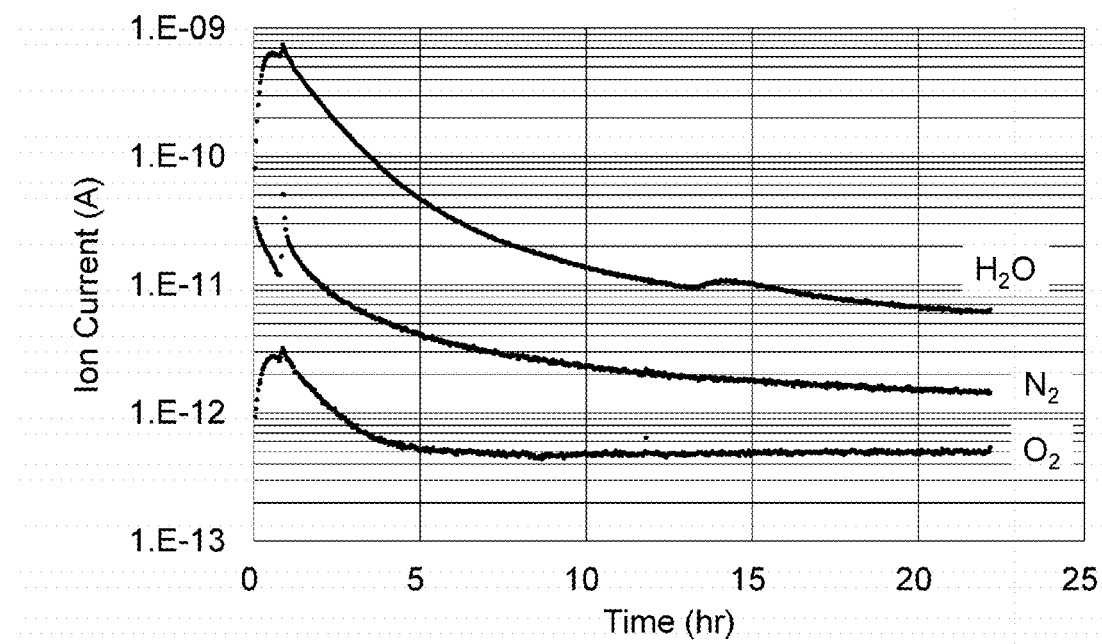
FIG. 14 is a graph showing changes in the ion current values of a detector (mass analysis apparatus) after initiation of the evacuation inside the external chamber in Comparative Example 1 related to the barrier properties evaluation apparatus of the present invention.

As shown in FIG. 14, it is understood that the relationship between the time after the initiation of evacuation of the space 53 in the external chamber and the ion current of the detection unit (mass analysis apparatus) 32 is such that the ion currents for water vapor and oxygen are increased after about 10 minutes, and such gas components have flowed into the space on the permeation side 51. Subsequently, it required about one day until the apparatus came to stabilization to the original level.

From a comparison between Example 1 and Comparative Example 1, it was found that by using the polymer film 3 as in Example 1, inflow of gas components in the atmosphere into the space on the permeation side 51 at the time of sample exchange is suppressed, and measurement can be started rapidly by introducing water vapor.

Figure 15:
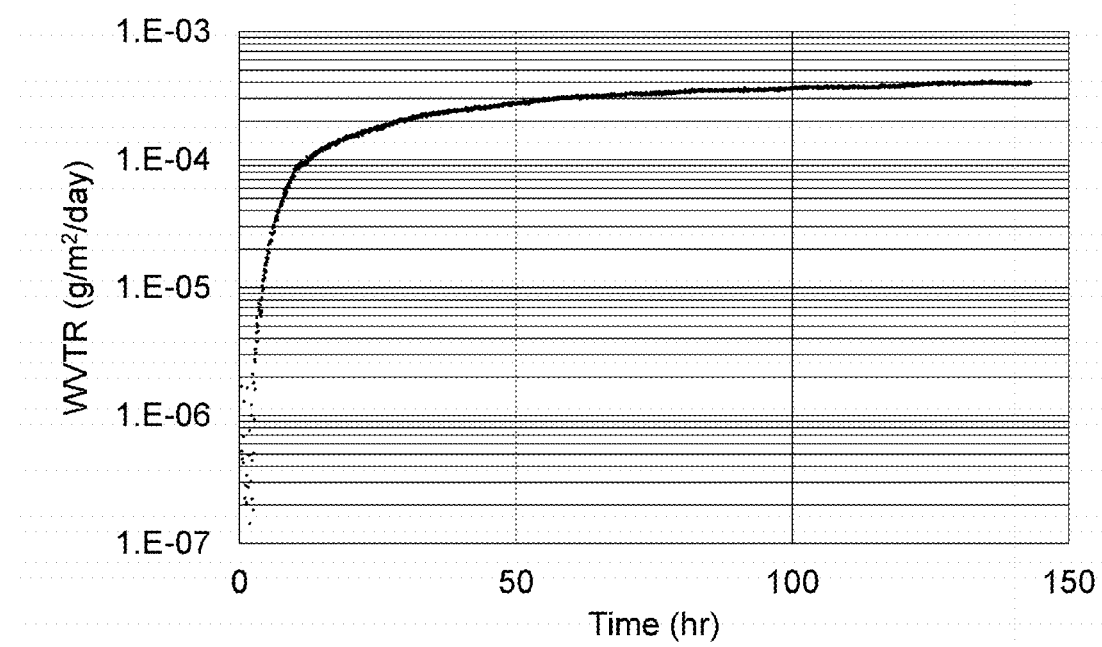
FIG. 15 is a graph showing a change in the WVTR value after initiation of the evacuation inside the external chamber in Comparative Example 1 related to the barrier properties evaluation apparatus of the present invention.

Meanwhile, thereafter, the chamber on the supply side 42 was moved to close the space on the supply side 52, and water vapor was introduced through the supply side gas piping 73. As a result, the change in the WVTR value was as shown in FIG. 15, and the value was almost stabilized after a lapse of about 5 days. Thus, a value of $4 \times 10^{-4}$ g/m² day, which is the same as that of Example 1, was obtained.

Furthermore, in an apparatus having the same structure as that of Comparative Example 1, except that the apparatus did not have a support 2, Cellophane having a thickness of 40 μm was used as a film-like sample 1. When water vapor was introduced into the space on the supply side 52, the sample 1 was broken, and water vapor penetrated into the space on the permeation side 51. As a result, the filament in the detector (mass analysis apparatus) 32 was down, and exchange was needed. That is, in conventional apparatuses, it is understood that safety measures are needed for the occasion of damage of the sample 1 or impairment of the joining between the support 2 and the chamber on the permeation side 41.

Example 2

An evaluation was carried out using the same apparatus and the same procedure as those of Example 1, except that as the sample 1, a polyethylene terephthalate film having a thickness of 0.1 mm and having a barrier layer formed on the surface was used as a film-like sample different from that of Example 1.

Figure 16:
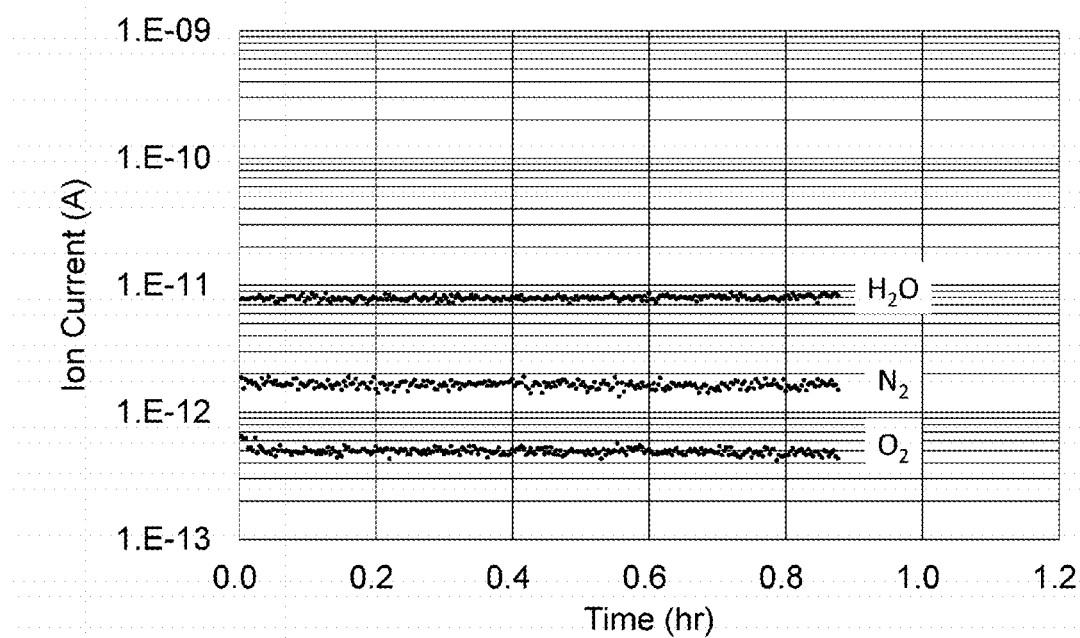
FIG. 16 is a graph showing changes in the ion current values of a detector (mass analysis apparatus) after initiation of the evacuation inside the external chamber in Example 2 related to the barrier properties evaluation apparatus of the present invention.

The relationship between the time after the initiation of evacuation of the space 53 in the external chamber and the ion current values of the detection unit (mass analysis apparatus 32) is shown in FIG. 16. The ion current values for water vapor, nitrogen, and oxygen did not change over one hour, and it is understood that there was no inflow of those gas components into the space on the permeation side 51.

From these results, it was found that even with a sample different from Example 1, inflow of gas components in the atmosphere into the space on the permeation side 51 is similarly suppressed.

Figure 17:
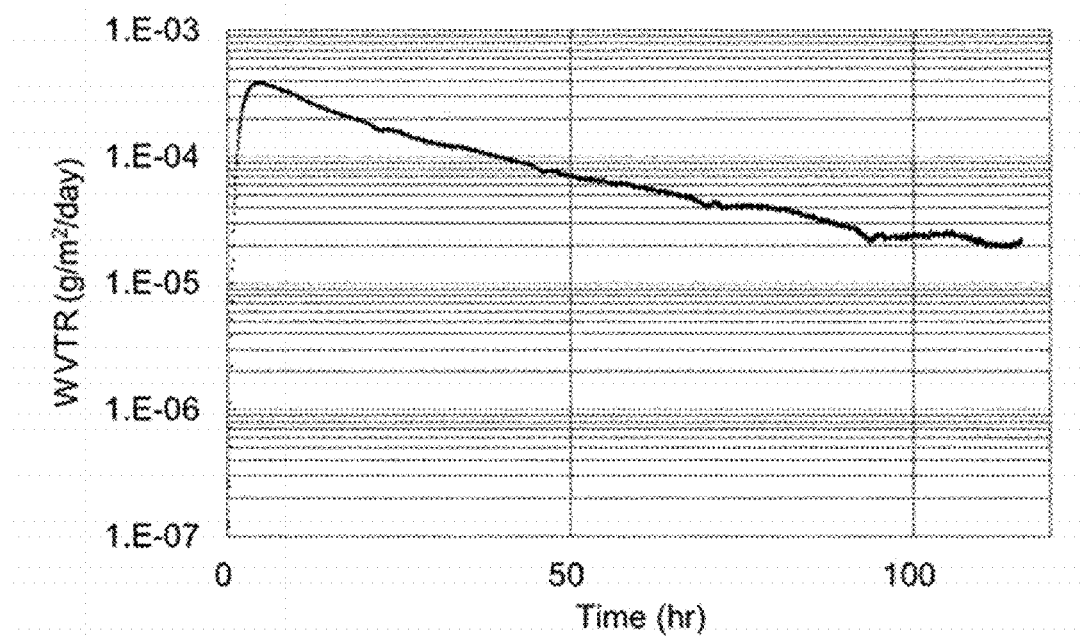
FIG. 17 is a graph showing a change in the WVTR value after initiation of the evacuation inside the external chamber in Example 2 related to the barrier properties evaluation apparatus of the present invention.

Subsequently, the chamber on the supply side 42 was lowered, the space on the supply side 52 was closed, and water vapor was introduced through the supply side gas piping 73. As a result, the change in the WVTR value was as shown in FIG. 17, and the value was almost stabilized after a lapse of about 5 days. Thus, a value of $2 \times 10^{-5}$ g/m² day was obtained.

Example 3

In order to understand the essence of the effects of the present invention, a test was carried out using the same apparatus and the same procedure as those of Example 1 without using the sample 1.

First, as shown in FIG. 1, it was assumed that measurement of gas barrier properties was completed, and the space on the supply side 52 was evacuated through the supply side gas piping 73. After sufficient evacuation was achieved, the piping of the exhaust system of the supply side gas piping 73 was closed, and the chamber on the supply side 42 was pulled up. Subsequently, dry gas was introduced through the external chamber gas piping 75. When the chamber on the supply side 42 was pulled up, since pressing from above was eliminated, a small space was naturally formed between the polymer film 3 and the support 2. In this space, the surrounding dry gas that has been introduced through the external chamber gas piping 75 flew in, and thereby a protective region 4 was formed. This state corresponds to FIG. 2.

Figure 18:
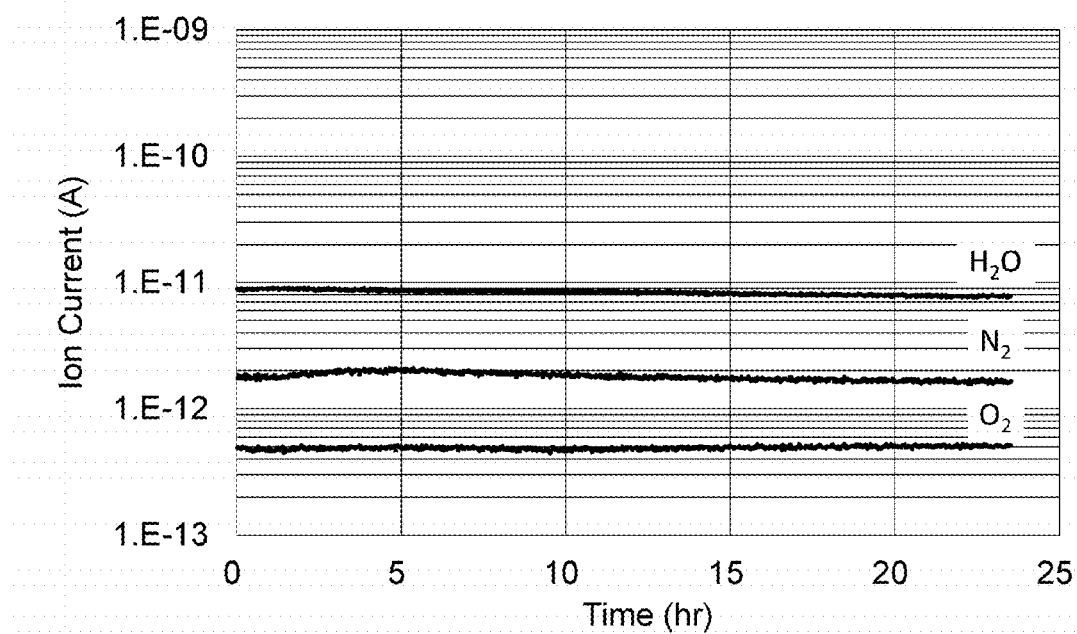
FIG. 18 is a graph showing changes in the ion current values of a detector (mass analysis apparatus) after initiation of the evacuation inside the external chamber in Example 3 related to the barrier properties evaluation apparatus of the present invention.

Subsequently, the external chamber on the supply side 82 was pulled up. This state corresponds to FIG. 3. Simulating the exchange of the sample, the state was retained for 90 seconds, subsequently, the external chamber on the supply side 82 was lowered, and the space 53 in the external chamber was closed. The space 53 in the external chamber was evacuated through the external chamber gas piping 75. This corresponds to the state illustrated in FIG. 2. The relationship between the time after the initiation of evacuation of the space 53 in the external chamber and the ion current values of the detection unit (mass analysis apparatus 32) is shown in FIG. 18. As shown in FIG. 18, the ion current values for water vapor, nitrogen, and oxygen did not change over 24 hours, and it is understood that there was no inflow of those gas components into the space on the permeation side 51. A slight amount of nitrogen was seen; however, the change was not significant.

Comparative Example 2

A test was carried out by the same procedure as that of Example 3 as described above, using an apparatus for evaluating gas barrier properties 10b that did not use a polymer film 3 as explained in FIGS. 4 to 6, and without using the sample 1.

Figure 19:
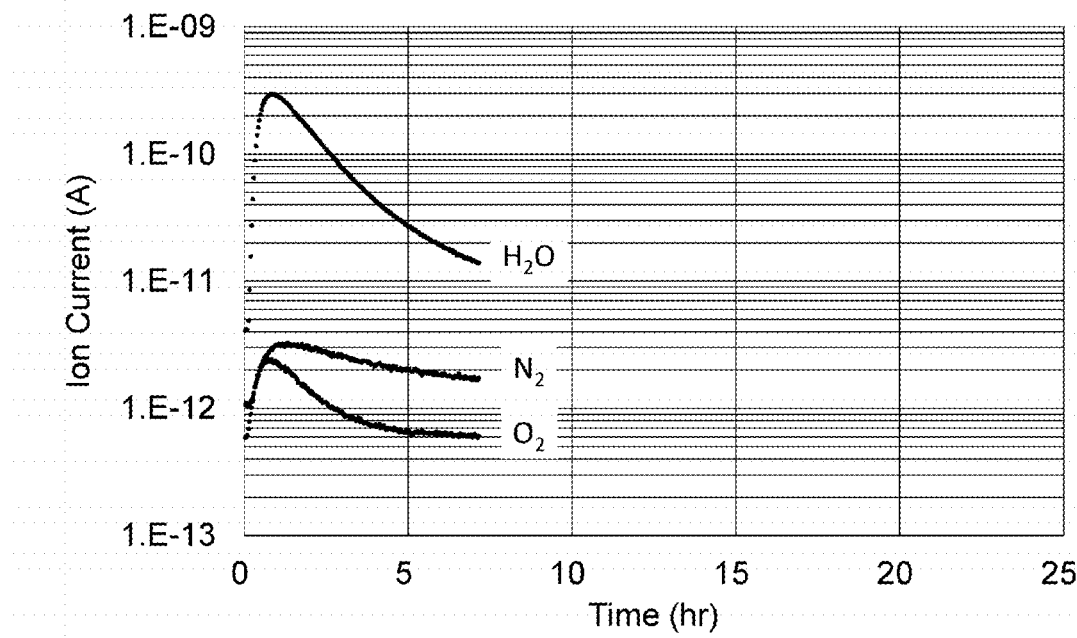
FIG. 19 is a graph showing changes in the ion current values of a detector (mass analysis apparatus) after initiation of the evacuation inside the external chamber in Comparative Example 2 related to the barrier properties evaluation apparatus of the present invention.

The relationship between the time after the initiation of evacuation of the space 53 in the external chamber and the ion current values of the detection unit (mass analysis apparatus 32) is shown in FIG. 19. From about 10 minutes after initiation of evacuation, the ion current values for water vapor, nitrogen, and oxygen increased, and it was found that these gases flowed into the space on the permeation side 51.

Evacuation was continued for 8 hours, and the ion current value of oxygen returned to the level before evacuation. However, for water vapor and nitrogen, the ion current values did not return to the original level. From a comparison between this test and Example 3, it became clear that by using the polymer film 3, penetration of gas components in the atmosphere into the space on the permeation side 51 can be prevented.

Example 4

In order to understand the essence of the effects of the present invention, a test was carried out using the apparatus for evaluating gas barrier properties 10 (10d) explained above using FIG. 10.

First, for the sample exchange, the space on the supply side 52 was evacuated through the supply side gas piping 73. After sufficient evacuation was achieved, the piping of the exhaust system of the supply side gas piping 73 was closed, and the chamber on the supply side 42 was pulled up. Subsequently, dry gas was introduced through the external chamber gas piping 75. When the chamber on the supply side 42 was pulled up, since pressing from above was eliminated, a small space was naturally formed between the polymer film 3 and the support 2. In this space, dry gas that has been introduced through the external chamber gas piping 75 flowed in, and thereby a protective region 4 was formed. This state corresponds to the state of the apparatus shown in FIG. 10.

Figure 20:
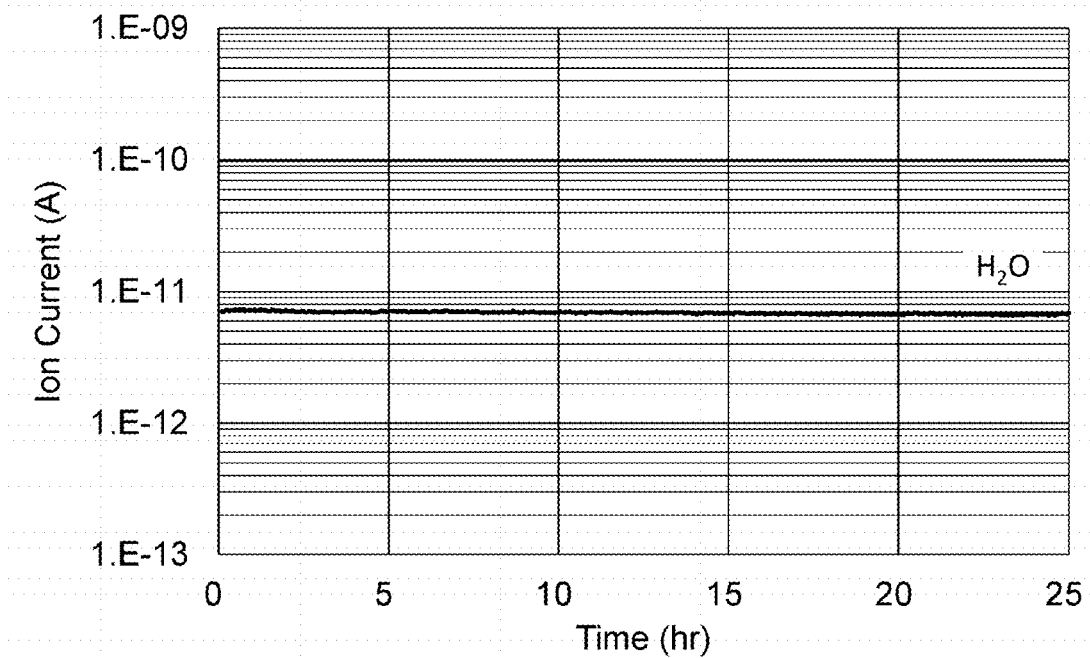
FIG. 20 is a graph showing a change in the ion current value of a detector (mass analysis apparatus) after initiation of the evacuation inside the external chamber in Example 3 related to the barrier properties evaluation apparatus of the present invention.

Subsequently, the external chamber on the supply side 82 was pulled up. The sample was exchanged over 30 seconds, subsequently, the external chamber on the supply side 82 was lowered, and the space 53 in the external chamber was closed. The space 53 in the external chamber was evacuated through the external chamber gas piping 75. The relationship between the time after the initiation of evacuation of the space 53 in the external chamber and the ion current value of the detection unit (mass analysis apparatus 32) is shown in FIG. 20. As shown in FIG. 20, the ion current value for water vapor did not change over 24 hours, and it is understood that there was no inflow of those gas components into the space on the permeation side 51. That is, it became clear that even with the apparatus of the apparatus for evaluating gas barrier properties 10 (10d), the effects of the present invention can be obtained.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2017-035207 filed in Japan on Feb. 27, 2017, which is entirely herein incorporated by reference.

REFERENCE SIGNS LIST

1 Sample
2 Support
3, 3A, 3B, 3C Polymer film
4 Protective region
5 Region on support surface
6 Hole
7 Polymer film support ring
10 Apparatus for evaluating gas barrier properties
32 Detection unit (mass analysis apparatus)
41 Chamber on permeation side
41a Opening of chamber on permeation side
42 Chamber on supply side
42a Opening of chamber on supply side
51 Space on permeation side
52 Space on supply side
53 Space in external chamber
62 Valve
72 Gas piping on permeation side
73 Supply side gas piping
75 External chamber gas piping
81 External chamber on permeation side
81a Opening of external chamber on permeation side
82 External chamber on supply side
82a Opening of external chamber on supply side

The invention claimed is:

1. An apparatus for evaluating gas barrier properties, comprising a support having a polymer for supporting a sample, a chamber on a permeation side, and a detection unit, the support being joined to an opening of the chamber on a permeation side;
wherein
a polymer film is provided between the support and the sample;
a chamber on a supply side is provided, being disposed so as to be closably attachable to the sample and able to go up and down; and
an external chamber covers a region interposed between the polymer film and the support.

2. The apparatus for evaluating gas barrier properties according to claim 1, wherein the external chamber provides a protective region formed from a dry gas between the support and the polymer film.

3. The apparatus for evaluating gas barrier properties according to claim 1, wherein a dry gas source is connected to the external chamber.

4. The apparatus for evaluating gas barrier properties according to claim 1, wherein a gas piping for introducing a dry gas into the space in the external chamber prior to the sample exchange and for evacuating the space in the external chamber after the sample exchange is provided with the external chamber.

5. The apparatus for evaluating gas barrier properties according to claim 1, wherein the permeability to water vapor of the support is $1\times10^{-8}$ mol/m$^2$sPa to $1\times10^{-14}$ mol/m$^2$sPa.

6. The apparatus for evaluating gas barrier properties according to claim 1, wherein the support is formed from a polyimide.

7. The apparatus for evaluating gas barrier properties according to claim 1, wherein the polymer film has a hole penetrating through in the thickness direction, and is fixed and joined to an opening of the external chamber.

8. The apparatus for evaluating gas barrier properties according to claim 1, wherein the polymer film blocks an opening of a polymer film support ring having the opening at the center and is fixed to the polymer film support ring.

9. The apparatus for evaluating gas barrier properties according to claim 1, wherein the thickness of the polymer film is 1 µm to 100 µm.

10. The apparatus for evaluating gas barrier properties according to claim 1, wherein the detection unit is a mass analysis apparatus.

11. A method of evaluating gas barrier properties, which comprises using an apparatus for evaluating gas barrier properties,
wherein the apparatus for evaluating gas barrier properties comprises:
a support having a polymer;
a chamber on a permeation side; and
a detection unit,
wherein a front surface side of the support supports a sample while a rear surface side of the support is joined to an opening of the chamber on a permeation side,
wherein a polymer film is disposed between the support and the sample, and
wherein a protective region formed from a dry gas is provided between the support and the polymer film at a time of exchanging the sample.

12. The method of evaluating gas barrier properties according to claim 11, wherein the apparatus for evaluating gas barrier properties comprises an external chamber capable of isolating a region interposed between the polymer film and the support from atmospheric air, and
wherein the protective region is provided by introducing a dry gas into the external chamber at the time of exchanging the sample.

13. The method of evaluating gas barrier properties according to claim 12, wherein a gas piping for introducing a dry gas into the space in the external chamber prior to the sample exchange and for evacuating the space in the external chamber after the sample exchange is provided with the external chamber;
wherein, prior to the sample exchange, a dry gas is introduced into the space in the external chamber through the gas piping, to form the protective region between the support and the polymer film; and
wherein, after the sample exchange, the space in the external chamber is evacuated through the gas piping.

14. The method of evaluating gas barrier properties according to claim 12, wherein the polymer film has a hole penetrating through in the thickness direction, and is fixed and joined to an opening of the external chamber.

15. The method of evaluating gas barrier properties according to claim 11, wherein the permeability to water vapor of the support is $1 \times 10^{-8}$ mol/m$^2$sPa to $1 \times 10^{-14}$ mol/m$^2$sPa.

16. The method of evaluating gas barrier properties according to claim 11, wherein the support is formed from a polyimide.

17. The method of evaluating gas barrier properties according to claim 11, wherein the polymer film blocks an opening of a polymer film support ring having the opening at the center and is fixed to the polymer film support ring.

18. The method of evaluating gas barrier properties according to claim 11, wherein the thickness of the polymer film is 1 μm to 100 μm.

19. The method of evaluating gas barrier properties according to claim 11, wherein the detection unit is a mass analysis apparatus.

* * * * *